(12) United States Patent
Lee et al.

(10) Patent No.: US 10,332,101 B2
(45) Date of Patent: Jun. 25, 2019

(54) MAGNETIC SECURE TRANSMISSION DEVICE AND ELECTRONIC DEVICE INCLUDING THE MAGNETIC SECURE TRANSMISSION DEVICE

(71) Applicant: Samsung Electronics Co., Ltd., Suwon-si, Gyeonggi-do (KR)

(72) Inventors: Sungwoo Lee, Suwon-si (KR); Youngjin Moon, Seoul (KR); Hyoungseok Oh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/854,162

(22) Filed: Dec. 26, 2017

(65) Prior Publication Data

US 2018/0365681 A1 Dec. 20, 2018

(30) Foreign Application Priority Data

Jun. 19, 2017 (KR) .......................... 10-2017-0077431

(51) Int. Cl.
*G06Q 20/34* (2012.01)
*H01F 1/34* (2006.01)
*H04B 5/00* (2006.01)
*H01F 38/14* (2006.01)

(52) U.S. Cl.
CPC .............. *G06Q 20/341* (2013.01); *H01F 1/34* (2013.01); *H01F 38/14* (2013.01); *H04B 5/0056* (2013.01); *H04B 5/0075* (2013.01); *H01F 2038/143* (2013.01)

(58) Field of Classification Search
CPC ......... G06Q 20/341; H01F 38/14; H01F 1/34; H01F 2038/14; H04B 5/0075; H04B 5/0056
See application file for complete search history.

(56) References Cited

U.S. PATENT DOCUMENTS

| 8,446,257 | B2 | 5/2013 | Chou et al. |
| 9,361,613 | B2 | 6/2016 | Wallner |
| 2016/0203472 | A1 | 7/2016 | Wallner |
| 2016/0210615 | A1* | 7/2016 | Lee .................... G06Q 20/3278 |
| 2016/0308587 | A1 | 10/2016 | Lee et al. |
| 2018/0032850 | A1 | 2/2018 | Lee et al. |
| 2018/0040950 | A1* | 2/2018 | Lee ........................ H01Q 1/526 |

FOREIGN PATENT DOCUMENTS

| CN | 107682050 A | 2/2018 |
| JP | 2016-208388 A | 12/2016 |
| KR | 10-2016-0040484 A | 4/2016 |

* cited by examiner

*Primary Examiner* — Seung H Lee
(74) *Attorney, Agent, or Firm* — Harness, Dickey & Pierce, P.L.C.

(57) ABSTRACT

A magnetic secure transmission (MST) device which generates an MST signal includes a first transmitter, a first coil that generates a first signal depending on an operation of the first transmitter, a second transmitter that operates at an operating frequency of the first transmitter, and a second coil that generates a second signal for offsetting or compensating for the first signal depending on an operation of the second transmitter. The MST signal is generated as the first signal and the second signal overlap each other.

20 Claims, 19 Drawing Sheets

MAGNETIC SECURE TRANSMISSION DEVICE AND ELECTRONIC DEVICE INCLUDING THE MAGNETIC SECURE TRANSMISSION DEVICE

CROSS-REFERENCE TO RELATED APPLICATIONS

This U.S. non-provisional application claims priority under 35 U.S.C. § 119 to Korean Patent Application No. 10-2017-0077431 filed on Jun. 19, 2017, in Korean Intellectual Property Office, the entire contents of which are incorporated herein by reference.

TECHNICAL FIELD

Example embodiments relate to an integrated circuit. For example, at least some example embodiments relate to a magnetic secure transmission (MST) device and/or an electronic device including the same.

BACKGROUND

Portable electronic devices such as a smartphone, a mobile device, and a tablet provide a user with various functions. The portable electronic devices have been rapidly supplied to consumers. In addition, a demand of a user for the portable electronic device has been diversified. Accordingly, functions that the portable electronic device has to support have increased.

One of the functions that the electronic device may support is a payment function through magnetic secure transmission (MST). The MST-based payment function replaces an existing card-type payment means and provides the user with the payment function directly through a portable electronic device. For this reason, electronic devices with the payment function are increasing.

The area of a portable electronic device may be limited due to a device characteristic. As such, there may be a limitation on mounting various functions desired by users on the portable electronic device. Also, the capacity of a battery included in the portable electronic device may also be limited due to the limited area.

SUMMARY

Example embodiments of the inventive concepts provide a low-power MST device and/or an electronic device including the same.

According to an example embodiment, a magnetic secure transmission (MST) device may be configured to generate an MST signal. The MST device may include a first transmitter configured to operate at a first operating frequency; a first coil configured to generate a first signal based on an operation of the first transmitter; a second transmitter configured to operate at a second operating frequency, the second operating frequency being a same frequency as the first operating frequency associated with the first transmitter; and a second coil configured to generate a second signal based on an operation of the second transmitter, the second signal offsetting or compensating for the first signal, wherein the MST device generates the MST signal as the first signal and the second signal overlap each other.

According to an example embodiment, an MST device may be configured to generate an MST signal. The MST device may include a first transmitter configured to operate at a first operating frequency; a first coil configured to generate a first signal based on an operation of the first transmitter; a second transmitter configured to operate at a second operating frequency, the second operating frequency being a same frequency as the first operating frequency; and a second coil configured to generate a second signal based on an operation of the second transmitter, at least some of conducting wires of the second coil being between conducting wires of the first coil, wherein the MST device is configured to generate the MST signal as the first signal and the second signal overlap each other.

According to an example embodiment, an electronic device may include an MST device configured to generate an MST signal based on an overlap between a first signal and a second signal, the MST device including a first transmitter configured to generate the first signal and a second transmitter configured to generate the second signal for offsetting or compensating for the first signal; and a controller configured to control the first transmitter and the second transmitter.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Below, example embodiments of the inventive concepts may be described in detail and clearly to such an extent that an ordinary one in the art easily implements the inventive concepts.

Figure 1:
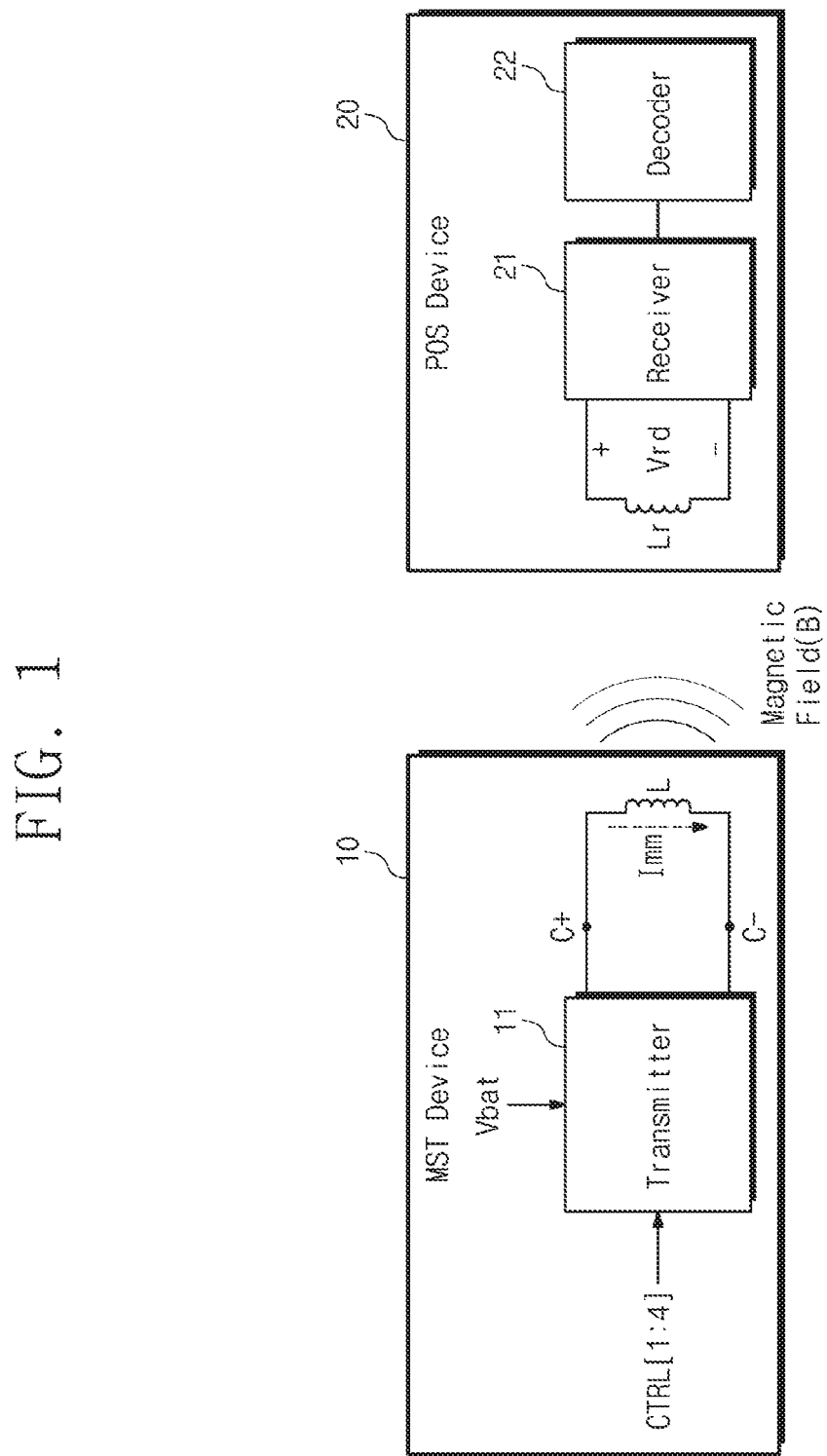
FIG. 1 is a view illustrating an MST device and a POS device.

FIG. 1 is a view illustrating an MST device and a POS device.

Referring to FIG. 1, a magnetic secure transmission (MST) device 10 may generate a magnetic field B and may provide information to a point of sale (POS) device 20 through the generated magnetic field B.

The MST is a technology that allows a credit card payment terminal to automatically load credit card information stored in an electronic device when the electronic device containing the credit card information directly or indirectly contacts the credit card payment terminal (e.g., a POS device) and to perform a payment. Through the MST technology, the payment information is transmitted to the credit card payment terminal. Payment information may include a primary account number (PAN), a device account number (DAN), virtual credit card information, a bank information number (BIN), a card security code (CSC), a card verification value (CVV), cryptogram, etc.

The MST device 10 may include a transmitter 11 and a coil "L". The transmitter 11 is driven by a power supply voltage Vbat. An operation of the transmitter 11 is controlled by a control signal CTRL[1:4]. Although not illustrated in FIG. 1, for example, the power supply voltage Vbat may be provided from a battery of an electronic device including the MST device 10, an external power source, etc. For example, the control signal CTRL[1:4] may be provided from a controller (or a processor) for controlling the MST device 10.

The transmitter 11 is connected with the coil "L" through terminals C+ and C−. To generate a signal to be provided to the POS device 20, the transmitter 11 operates such that at least one of the amount of an MST current Imm flowing to the coil "L" and a direction of the MST current Imm changes. The magnetic field "B" generated in the coil "L" may change as the MST current Imm changes (the amount or a direction of the MST current Imm changes). A read voltage Vrd is induced at the POS device 20 by the change in the magnetic field "B". The magnitude of the read voltage Vrd is proportional to the magnitude of a variation in the magnetic field "B". That is, a change in the magnetic field "B" generated in the MST device 10 is transferred to the POS device 20. The POS device 20 may generate the read voltage Vrd by the change in the magnetic field "B". In this specification, a signal having a form of a magnetic field (or a signal having a form of a variation in a magnetic field) is referred to as a "magnetic signal" or "MST signal".

For example, an inductance of the coil "L" may be changed by various factors such as an MST interface specification and a design specification of the MST device 10. In an example of FIG. 1, the transmitter 11 is illustrated as being connected with the single coil "L". However, example embodiments may not be limited thereto. For example, the transmitter 11 may be additionally connected with any circuit, any unit, any block, etc. For example, the transmitter 11 may be additionally connected with a resistor, a variable resistor, a capacitor, etc. used to adjust the amount of the MST current Imm or a variation in the MST current Imm. If necessary, the transmitter 11 may be additionally connected with a current measurement device (refer to FIG. 20) for measuring the MST current Imm.

The POS device 20 receives an MST signal provided from the MST device 10. The POS device 20 may include a coil "Lr" (hereinafter referred to as a "receiver coil") to receive an MST signal, a receiver 21, and a decoder 22. By mutual magnetic coupling, the read voltage Vrd is induced at the receiver coil Lr from the transmitted MST signal of the magnetic form. As in the coil "L", an inductance of the receiver coil "Lr" may be changed by various factors such as an MST interface specification and a design specification of the MST device 10 or the POS device 20.

The receiver 21 may amplify the magnitude of the read voltage Vrd to the magnitude of a signal recognizable in the decoder 22. The signal amplified by the receiver 21 is provided to the decoder 22. The decoder 22 decodes the provided signal. The POS device 20 may further include a processor for processing the decoded signal using, for example, known processing methods.

Figure 2:
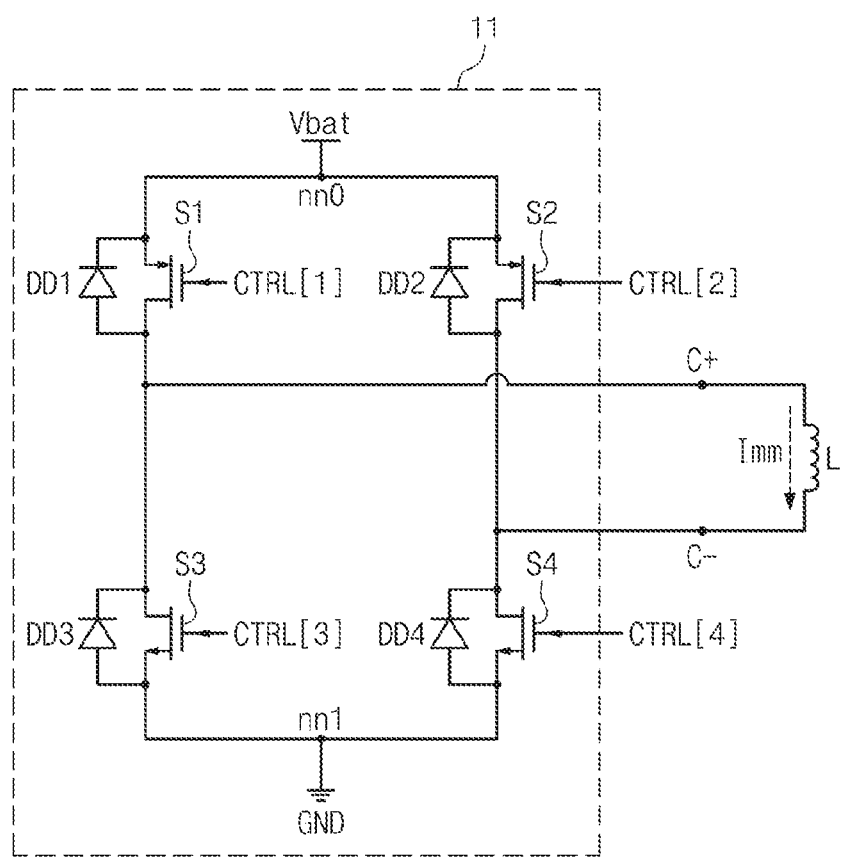
FIG. 2 is a view illustrating the MST device illustrated in FIG. 1.

FIG. 2 is a view illustrating an MST device illustrated in FIG. 1.

Referring to FIG. 2, the transmitter 11 may include first to fourth switches S1 to S4 and first to fourth diodes DD1 to DD4.

The first switch S1 forms a current path between a node nn0 and the terminal C+ in response to the control signal CTRL[1]. The first switch S1 may be implemented with a PMOS transistor controlled by the control signal CTRL[1]. An anode of the first diode DD1 is connected with the terminal C+, and a cathode thereof is connected with the node nn0.

The second switch S2 forms a current path between the node nn0 and the terminal C− in response to the control signal CTRL[2]. The second switch S2 may be implemented with a PMOS transistor controlled by the control signal CTRL[2]. An anode of the second diode DD2 is connected with the terminal C−, and a cathode thereof is connected with the node nn0.

The first diode DD1 may be a parasitic diode of the first switch S1 implemented with the PMOS transistor, and the second diode DD2 may be a parasitic diode of the second switch S2 implemented with the PMOS transistor. As illustrated in FIG. 2, since a source terminal of the first switch S1 is connected with the node nn0, the cathode of the first diode DD1 is connected to the node nn0. Also, since a source terminal of the second switch S2 is connected with the node nn0, the cathode of the second diode DD2 is connected to the node nn0. In the case where the first and second switches S1 and S2 are turned off, an unintended leakage current toward the terminal C+ from the node nn0 or toward the terminal C− from the node nn0 may be prevented by the first and second diodes DD1 and DD2 connected in a reverse direction to the node nn0.

The third switch S3 forms a current path between the terminal C+ and a node nn1 in response to the control signal CTRL[3]. The third switch S3 may be implemented with an NMOS transistor controlled by the control signal CTRL[3]. An anode of the third diode DD3 is connected with the node nn1, and a cathode thereof is connected with the terminal C+.

The fourth switch S4 forms a current path between the terminal C− and the node nn1 in response to the control signal CTRL[4]. The fourth switch S4 may be implemented with an NMOS transistor controlled by the control signal CTRL[4]. An anode of the fourth diode DD4 is connected with the node nn1, and a cathode thereof is connected with the terminal C−.

The third diode DD3 may be a parasitic diode of the third switch S3 implemented with the NMOS transistor, and the fourth diode DD4 may be a parasitic diode of the fourth switch S4 implemented with the NMOS transistor. In the case where the third and fourth switches S3 and S4 are turned off, an unintended leakage current toward the node nn1 from the terminal C+ or toward the node nn1 from the terminal C− may be prevented by the third and fourth diodes DD3 and DD4.

For example, the first and second switches S1 and S2 may be respectively implemented with NMOS transistors, and the third and fourth switches S3 and S4 may be respectively implemented with PMOS transistors. For another example, the first to fourth switches S1 to S4 may be implemented with NMOS transistors or PMOS transistors that are cascaded. Alternatively, each of the first to fourth switches S1 to S4 may be implemented in the form of a transmission gate in which an NMOS transistor and a PMOS transistor are connected in parallel. However, example embodiments may not be limited thereto. For example, the first to fourth switches S1 to S4 may be implemented with switches of any form.

A connection relationship of the first to fourth switches S1 to S4 changes depending on an operation of the transmitter 11. A direction or the amount of the MST current Imm flowing to the coil "L" changes by the changed connection relationship. The change in the MST current Imm generates an MST signal. An operation of the MST device 10 including the transmitter 11 will be more fully described with reference to FIG. 3.

Figure 3:
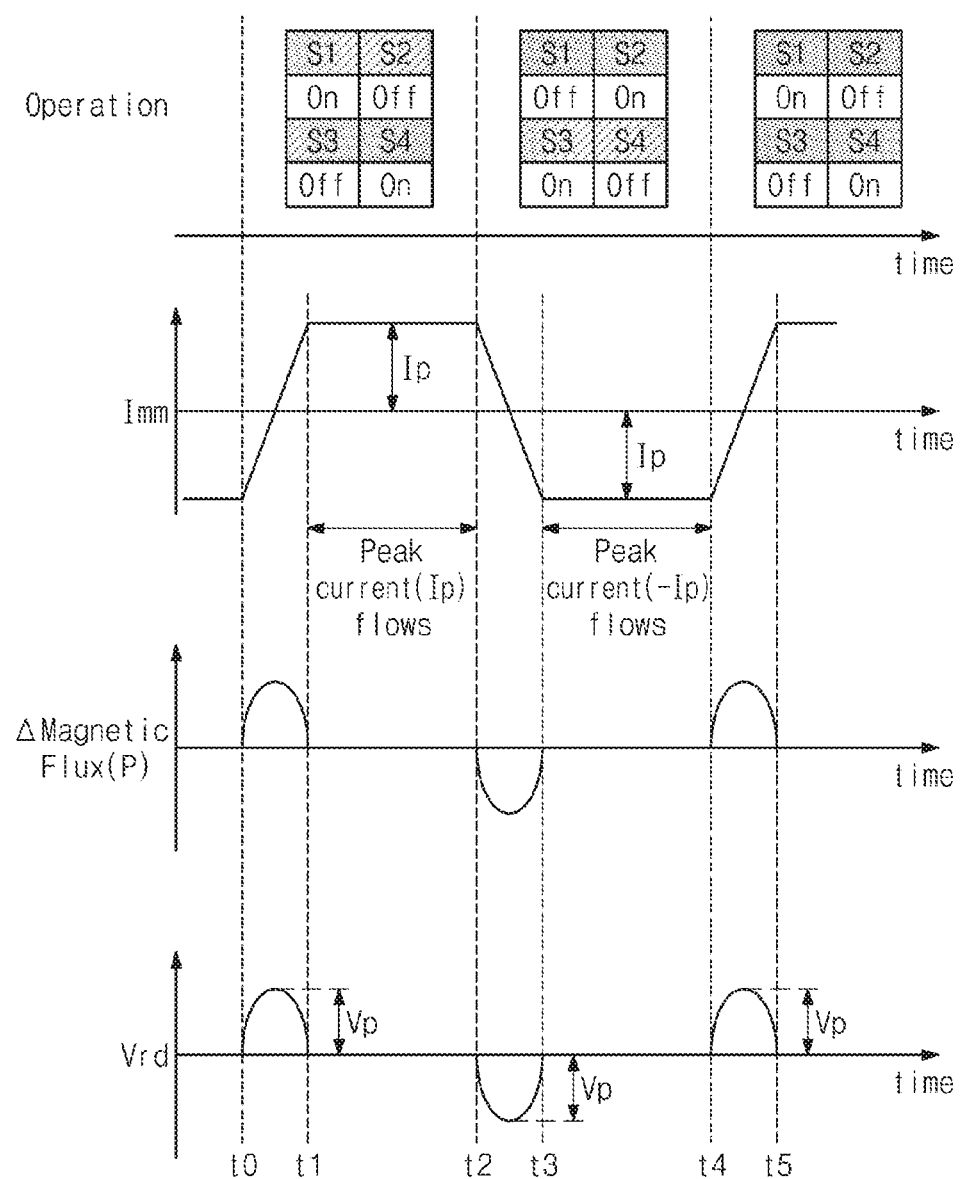
FIG. 3 is a timing diagram for describing an operation of the MST device of FIG. 2.

FIG. 3 is a timing diagram for describing an operation of an MST device of FIG. 2.

Referring to FIG. 3, a change in the MST current Imm, a magnetic flux change ΔMagnetic Flux, and a change in the read voltage Vrd according to an operation of the MST device 10 will be described with reference to FIGS. 1 to 3.

Below, the MST current Imm will be described with respect to a direction from the terminal C+ to the terminal C−. In this specification, a direction from the terminal C+ to the terminal C− is referred to as a "reference direction", and a direction from the terminal C− to the terminal C+ is referred to as an "opposite direction". Also, it is assumed that the magnetic field "B" is generated in a clockwise direction by the MST current Imm flowing in the reference direction. The coil "L" is configured such that the magnetic field "B" of the clockwise direction is generated by the MST current Imm of the reference direction. However, the direction of the magnetic field "B" is only one example. The direction of the magnetic field "B" may change with a direction of the MST current Imm flowing to the coil "L", a wound direction of the coil "L", etc.

As described above, the magnitude and direction of the generated magnetic field "B" change as the MST current Imm changes. In FIG. 3, a change in the magnetic flux is illustrated as an indicator for representing a change in the magnetic field "B". The magnetic flux is a physical quantity introduced to represent the magnitude of a magnetic field. The magnetic flux is defined by a product of the area of a virtual curved surface and a magnetic field component perpendicular to the curved surface. That is, the magnetic flux means the magnitude of the magnetic field. In this specification, a change in the magnetic flux or a variation in the magnetic flux is illustrated by "P".

The magnitude of the magnetic flux change "P" is proportional to the magnitude of the magnetic field change. As a result, the magnitude of the magnetic flux change "P" is proportional to the magnitude of the MST current (Imm) change. That is, the magnitude of the magnetic flux change "P" increases if a change in the MST current Imm is great. In contrast, the magnitude of the magnetic flux change "P" decreases if a change in the MST current Imm is small. The read voltage Vrd induced depending on the magnetic flux change "P" is defined by the equation of "Vrd=a×(P/dt)". Here, "a" is a constant determined depending on a characteristic of the coil "L" and the receiver coil "Lr".

The read voltage Vrd will be described with respect to a direction of a potential as illustrated in FIG. 1. The receiver coil "Lr" is configured such that the read voltage Vrd illustrated in FIG. 1 is generated by the magnetic field "B" of the clockwise direction. However, the direction in which the read voltage Vrd is formed is only one example. The direction may change depending on a direction of the MST current Imm, a wound direction of the coil "L" or the receiver coil Lr, etc. An operation of the MST device 10 is as follows.

From t0 to t1, the first switch S1 and the fourth switch S4 are turned on, and the second switch S2 and the third switch S3 are turned off. As operation states of the first to fourth switches S1 to S4 are changed, the MST current Imm flowing in an opposite direction before t0 flows in the reference direction. That is, the direction and the amount of the MST current Imm change compared with those before t0. The magnitude of the magnetic field "B" formed in the clockwise direction increases by the change in the MST current Imm from t0 to t1. Accordingly, a positive magnetic flux change "P" occurs. A positive read voltage Vrd is induced at opposite ends of the receiver coil "Lr" by the mutual magnetic coupling. In FIG. 3, the maximum magnitude of the read voltage Vrd is illustrated by "Vp". As a result, the MST device 10 transmits the change in the positive magnetic field "B" to the POS device 20 as the MST signal. The POS device 20 receives the transmitted MST signal as the positive read voltage Vrd.

From t1 to t2, the first to fourth switches S1 to S4 maintain the same operation states as held from t0 to t1. Accordingly, the MST current Imm having a maximum current amount Ip flows in the reference direction. Since the direction or the amount of the MST current Imm does not change, the change in the magnetic field "B" and the magnetic flux change "P" do not occur. Accordingly, the read voltage Vrd is not induced at the POS device 20.

From t2 to t3, the second switch S2 and the third switch S3 are turned on, and the first switch S1 and the fourth switch S4 are turned off. As operation states of the first to fourth switches S1 to S4 are changed, the MST current Imm flowing in the reference direction from t0 to t2 flows in the opposite direction. That is, the direction and the amount of the MST current Imm change from t2 to t3. Accordingly, the magnitude of the magnetic field "B" formed in the counterclockwise direction increases by the change in the MST current Imm. Accordingly, a negative magnetic flux change "P" occurs. A negative read voltage Vrd is induced at the opposite ends of the receiver coil "Lr" by the mutual magnetic coupling. As a result, the MST device 10 transmits the change in the negative magnetic field "B" to the POS device 20 as the MST signal. The POS device 20 receives the transmitted MST signal as the negative read voltage Vrd.

From t3 to t4, the first to fourth switches S1 to S4 maintain the same operation states as held from t2 to t3. Accordingly, the MST current Imm having a maximum current amount Ip flows in the opposite direction. Since the direction or the amount of the MST current Imm does not change, the change in the magnetic field "B" and the magnetic flux change "P" do not occur. Accordingly, the read voltage Vrd is not induced at the POS device 20.

An operation of the MST device 10 after t4 is the same as described from t0 to t4. Also, a change in the MST current Imm, a change in the magnetic field "B", the magnetic flux change "P", and a change in the read voltage Vrd after t4 through an operation of the MST device 10 are the same as described from t0 to t4, and a description thereof is thus omitted.

The MST device 10 may control the MST current Imm depending on transferred data such that the MST current Imm increases or decreases. A periodic change in the MST current Imm may define a period of the MST signal and a period of the read voltage Vrd. The POS device 20 may determine logic 1" and logic "0" based on a period of the read voltage Vrd.

For example, a waveform of the read voltage Vrd may include an interval having a first period shorter than a reference period and an interval having a second period longer than the reference period. The waveform of the read voltage Vrd of the first period may mean logic "1", and the waveform of the read voltage Vrd of the second period may mean logic "0". For example, an interval from t0 to t3 in which the positive read voltage Vrd and the negative read voltage Vrd are induced may correspond to the first period. In this case, the POS device 20 may determine the first period to decode data of logic "1" from the read voltage Vrd. Alternatively, the interval from t0 to t3 may correspond to the second period. In this case, the POS device 20 may determine the second period to decode data of logic "0" from the read voltage Vrd.

As another example, the waveform of the read voltage Vrd of the first period may mean logic "0", and the waveform of the read voltage Vrd of the second period may mean logic "1". The period of the waveform of the read voltage Vrd may be controlled by a control timing of the control signal CTRL[1:4]. Lengths of the first and second periods described above may be changed if necessary.

Referring to FIGS. 1 to 3, from t1 to t2 and from t3 to t4, the MST current Imm having a current amount of Ip flows to the transmitter 11 and the coil "L". That is, the MST current Imm of the maximum current amount flows in the corresponding interval. Also, in intervals from t0 to t1, from t2 to t3, and from t4 to t5, the MST current Imm may change from "−Ip" to "Ip" or may change from "Ip" to "−Ip".

Power consumption of the MST device 10 is determined by "Vbat X Imm". That is, the power consumption of the MST device 10 is proportional to the amount of the MST current Imm and may be maximized when the MST current Imm of the maximum current amount Ip flows. Accordingly, the power consumption of the MST device 10 may decrease in proportion to the maximum current amount Ip by reducing the maximum current amount Ip of the MST current Imm. Below, an MST device capable of reducing the maximum current amount Ip of the MST current Imm under the same power supply voltage Vbat will be described.

Figure 4:
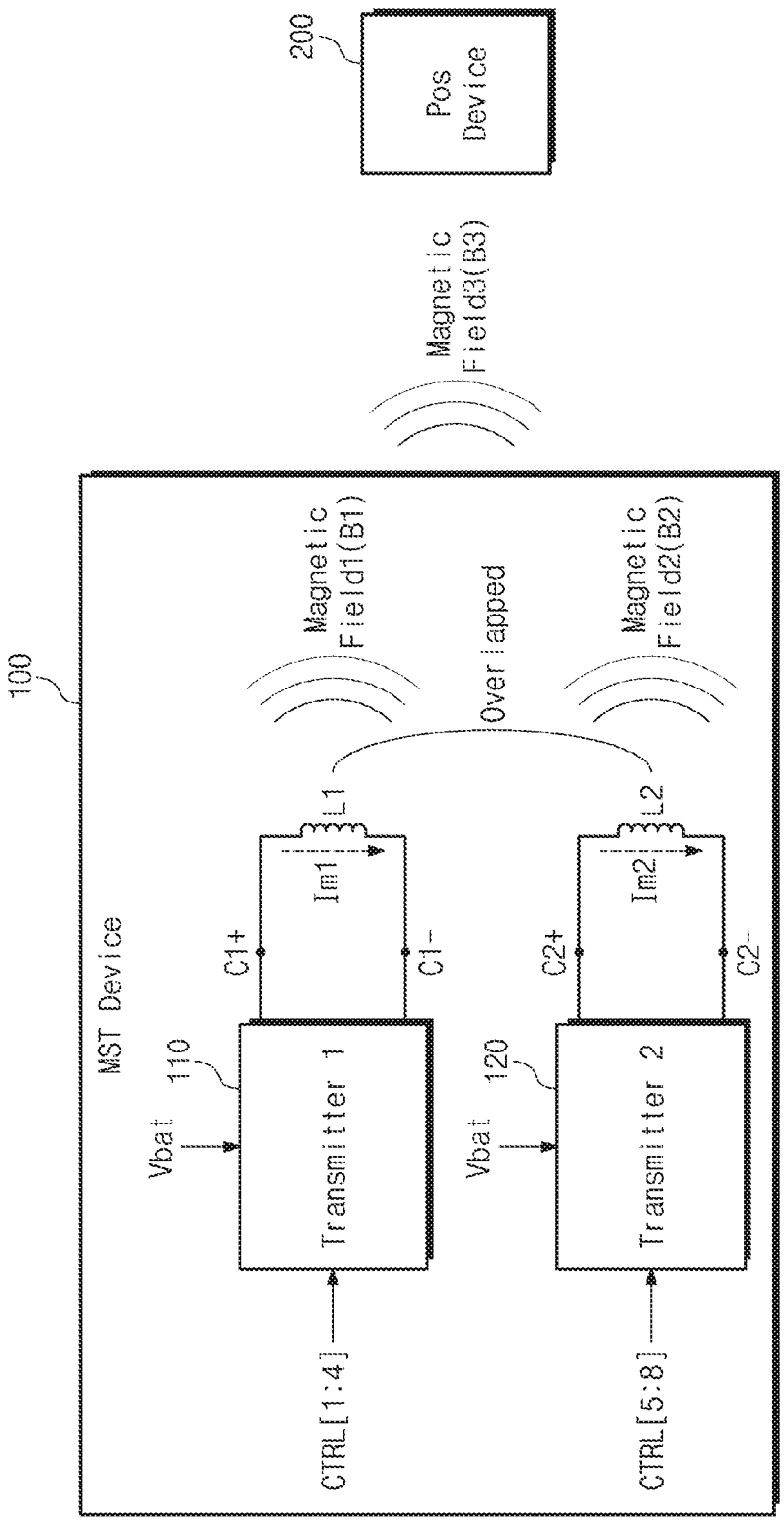
FIG. 4 is a view illustrating the MST device and the POS device according to an example embodiment of the inventive concepts.

FIG. 4 is a view illustrating an MST device and a POS device according to an example embodiment of the inventive concepts.

Referring to FIG. 4, an MST device 100 may include a first transmitter 110, a second transmitter 120, a first coil L1, and a second coil L2. As in the MST device 10 of FIG. 1, the MST device 100 of FIG. 4 may provide information to a POS device 200 through an MST signal. For example, the POS device 200 may include the POS device 20 of FIG. 1.

The first transmitter 110 is driven by the power supply voltage Vbat. An operation of the first transmitter 110 is controlled by the control signal CTRL[1:4]. The first transmitter 110 is connected with the first coil L1 through terminals C1+ and C1−. The first transmitter 110 operates in response to the control signal CTRL[1:4] such that at least one of the amount of a first MST current Im1 flowing to the first coil L1 and a direction of the first MST current Im1 changes. The first MST current Im1 generates a first magnetic field B1. Also, the first magnetic field B1 generated in the first coil L1 may change as the first MST current Im1 changes (the amount or a direction of the first MST current Im1 changes).

The second transmitter 120 is driven by the power supply voltage Vbat. An operation of the second transmitter 120 is controlled by the control signal CTRL[5:8]. The second transmitter 120 is connected with the second coil L2 through terminals C2+ and C2−. The second transmitter 120 operates in response to the control signal CTRL[5:8] such that at least one of the amount of a second MST current Im2 flowing to the second coil L2 and a direction of the second MST current Im2 changes. The second MST current Im2 generates a second magnetic field B2. The second magnetic field B2 generated in the second coil L2 may change as the second MST current Im2 changes (the amount or a direction of the second MST current Im2 changes).

Here, the change in second magnetic field B2 occurs to offset or compensate for the change in the first magnetic field B1. In detail, in an interval where the MST device 100 does not provide an MST signal to the POS device 200, the second transmitter 120 may control a change in the second magnetic field B2 so as to offset a change in the first magnetic field B1. The second transmitter 120 may adjust the second MST current Im2 for the purpose of adjusting a change in the second magnetic field B2. In an interval where the MST device 100 provides an MST signal to the POS device 200, the second transmitter 120 may control a change in the second magnetic field B2 so as to compensate for a change in the first magnetic field B1.

A third magnetic field B3 is generated as the first magnetic field B1 and the second magnetic field B2 overlap each other. Also, the MST signal is generated as the change in the first magnetic field B1 and the change in the second magnetic field B2 overlap each other. The MST signal is provided to the POS device 200. The read voltage Vrd is induced at the POS device 200 by the MST signal.

Through the above-described configuration and operation of the MST device 100, while the power supply voltage Vbat is maintained, the first transmitter 110 and the second transmitter 120 may reduce maximum current amounts of the first MST current Im1 and the second MST current Im2 to be smaller than "Ip". Accordingly, power consumption of the MST device 100 may be reduced. For example, according to an example embodiment of FIG. 6, a maximum current amount of each of the first MST current Im1 and the second MST current Im2 may decrease to "Ip/2". In this case, for example, the sizes of the first to fourth switches SW1 to SW4 of the first transmitter 110 and the sizes of the fifth to eighth switches SW5 to SW8 of the second transmitter 120 may be designed to be smaller than the sizes of the first to fourth switches S1 to S4 of the transmitter 11 of FIG. 2. Accordingly, according to the following example embodiment, the area of the MST device 100 may be reduced. Detailed operations of the first transmitter 110 and the second transmitter 120 will be described with reference to FIG. 6.

Each of the first coil L1 and the second coil L2 may be substantially the same as the coil "L" illustrated in FIG. 1. However, at least some of conducting wires of the first coil L1 may be formed to be located between conducting wires of the second coil L2. The reason is that a change in the first magnetic field B1 generated in the first coil L1 and a change in the second magnetic field B2 generated in the second coil L2 are offset in an interval where the MST device 100 does not provide an MST signal to the POS device 200. A configuration where the first coil L1 and the second coil L2 overlap each other will be more fully described with reference to FIGS. 15, 16, 18, and 19. In the example embodiments of FIGS. 4 to 16, a direction in which the first coil L1 is wound is the same as a direction in which the second coil L2 is wound. Accordingly, a direction of the first magnetic field B1 generated when the first MST current Im1 flows from the terminal C1+ to the terminal C1− is the same as a direction of the second MST current Im2 generated when the second MST current Im2 flows from the terminal C2+ to the terminal C2−. This will be described with reference to FIG. 6.

Except for the above description, a configuration of each of the first coil L1 and the second coil L2 is substantially the same as the coil "L" illustrated in FIG. 1, and a configuration of each of the first transmitter 110 and the second transmitter 120 is substantially the same as the transmitter 11 illustrated in FIG. 1.

For example, the control signal CTRL[1:8] may be provided through a controller (refer to FIG. 20) for controlling the MST device 100. For example, an inductance of each of the first coil L1 and the second coil L2 may be changed by various factors such as an MST interface specification and a design specification of the MST device 100. As in the description given in FIG. 1, each of the first transmitter 110 and the second transmitter 120 may be additionally connected with any circuit, any unit, any block, etc. for controlling the first MST current Im1 and the second MST current Im2, respectively.

Figure 5:
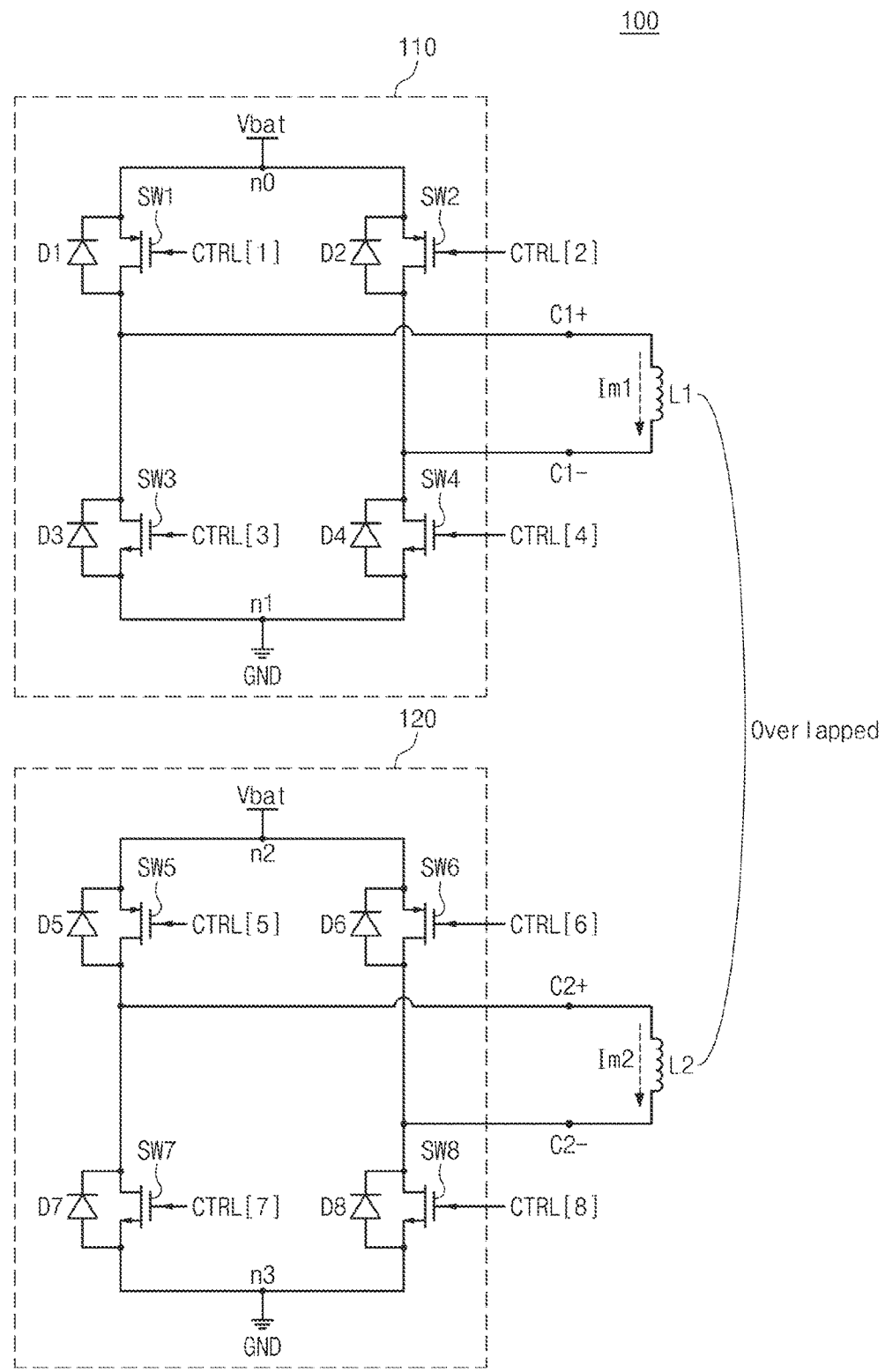
FIG. 5 is a circuit diagram illustrating the MST device illustrated in FIG. 4.

FIG. 5 is a circuit diagram illustrating an MST device illustrated in FIG. 4. Referring to FIG. 5, the first transmitter 110 may include first to fourth switches SW1 to SW4 and first to fourth diodes D1 to D4. Also, the second transmitter 120 may include fifth to eighth switches SW5 to SW8 and fifth to eighth diodes D5 to D8.

The first to fourth switches SW1 to SW4 of the first transmitter 110 may be respectively controlled by the control signals CTRL[1] to CTRL[4]. The first to fourth switches SW1 to SW4 and the first to fourth diodes D1 to D4 included in the first transmitter 110 correspond to the first to fourth switches S1 to S4 and the first to fourth diodes DD1 to DD4 illustrated in FIG. 2, respectively. Also, the first coil L1 corresponds to the coil "L" illustrated in FIG. 2. Accordingly, a detailed description associated with a configuration and a connection relationship of the first transmitter 110 is omitted.

The fifth to eighth switches SW5 to SW8 of the second transmitter 120 may be respectively controlled by the control signals CTRL[5] to CTRL[8]. The fifth to eighth switches SW5 to SW8 and the fifth to eighth diodes D5 to D8 included in the second transmitter 120 correspond to the first to fourth switches S1 to S4 and the first to fourth diodes DD1 to DD4 illustrated in FIG. 2, respectively. Also, the second coil L2 corresponds to the coil "L" illustrated in FIG. 2. Accordingly, a detailed description associated with a configuration and a connection relationship of the second transmitter 120 is omitted.

Figure 6:
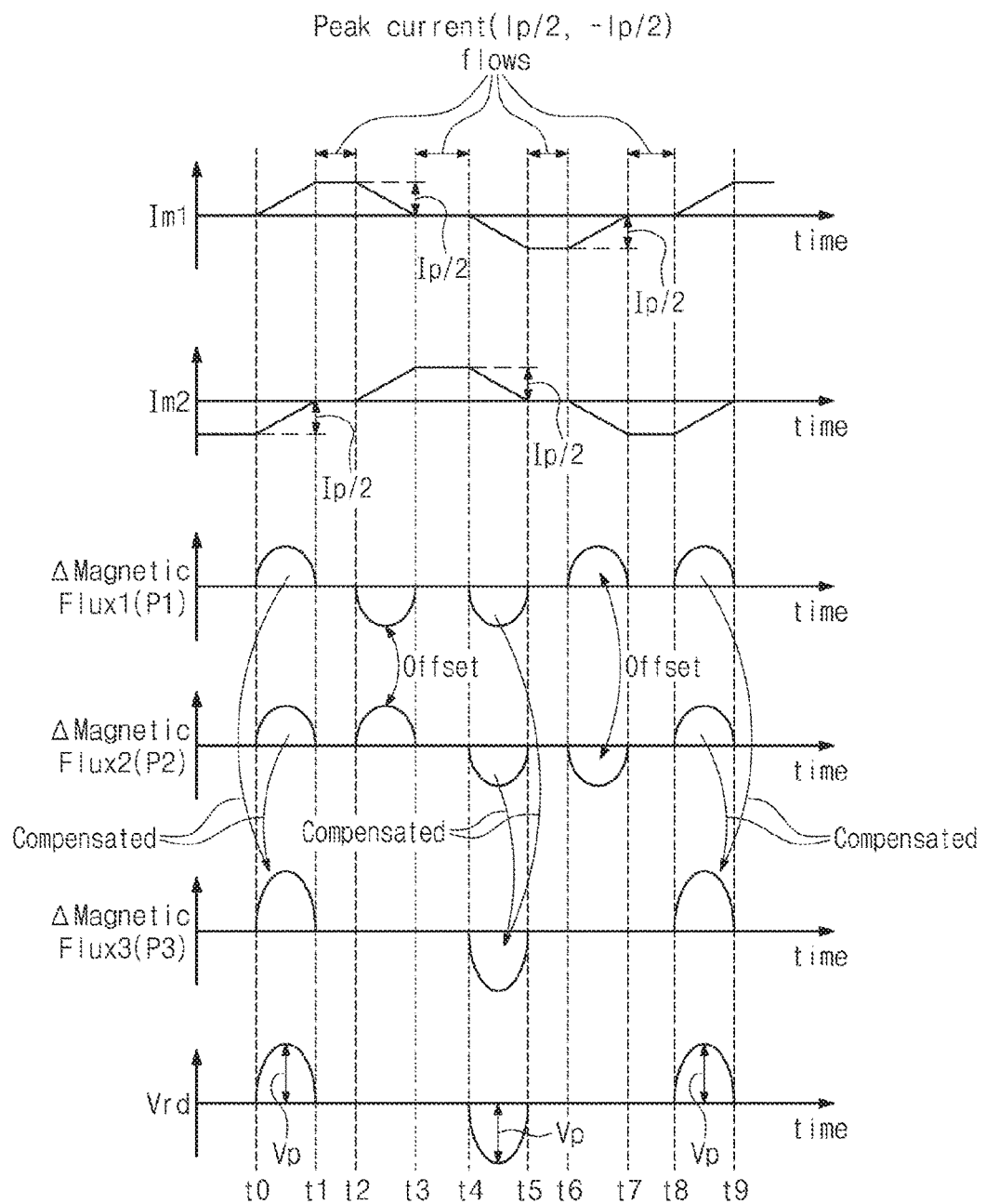
FIG. 6 is a timing diagram for describing an operation of the MST device of FIG. 4.

FIG. 6 is a timing diagram for describing an operation of an MST device of FIG. 4. A change in the first MST current Im1, a change in the second MST current Im2, a first magnetic flux change ΔMagnetic Flux1 (hereinafter referred to as "P1"), a second magnetic flux change ΔMagnetic Flux2 (hereinafter referred to as "P2"), a third magnetic flux change ΔMagnetic Flux3 (hereinafter referred to as "P"), and a change in a read voltage Vrd according to an operation of the MST device 100 will be described with reference to FIGS. 4 to 6.

Below, the first MST current Im1 will be described with respect to a direction from the terminal C1+ to the terminal C1−. In this specification, a direction from the terminal C1+ to the terminal C1− is referred to as a "reference direction", and a direction from the terminal C1− to the terminal C1+ is referred to as an "opposite direction". Also, the second MST current Im2 will be described with respect to a direction from the terminal C2+ to the terminal C2−. In this specification, a direction from the terminal C2+ to the terminal C2− is referred to as a "reference direction", and a direction from the terminal C2− to the terminal C2+ is referred to as an "opposite direction".

Figure 17:
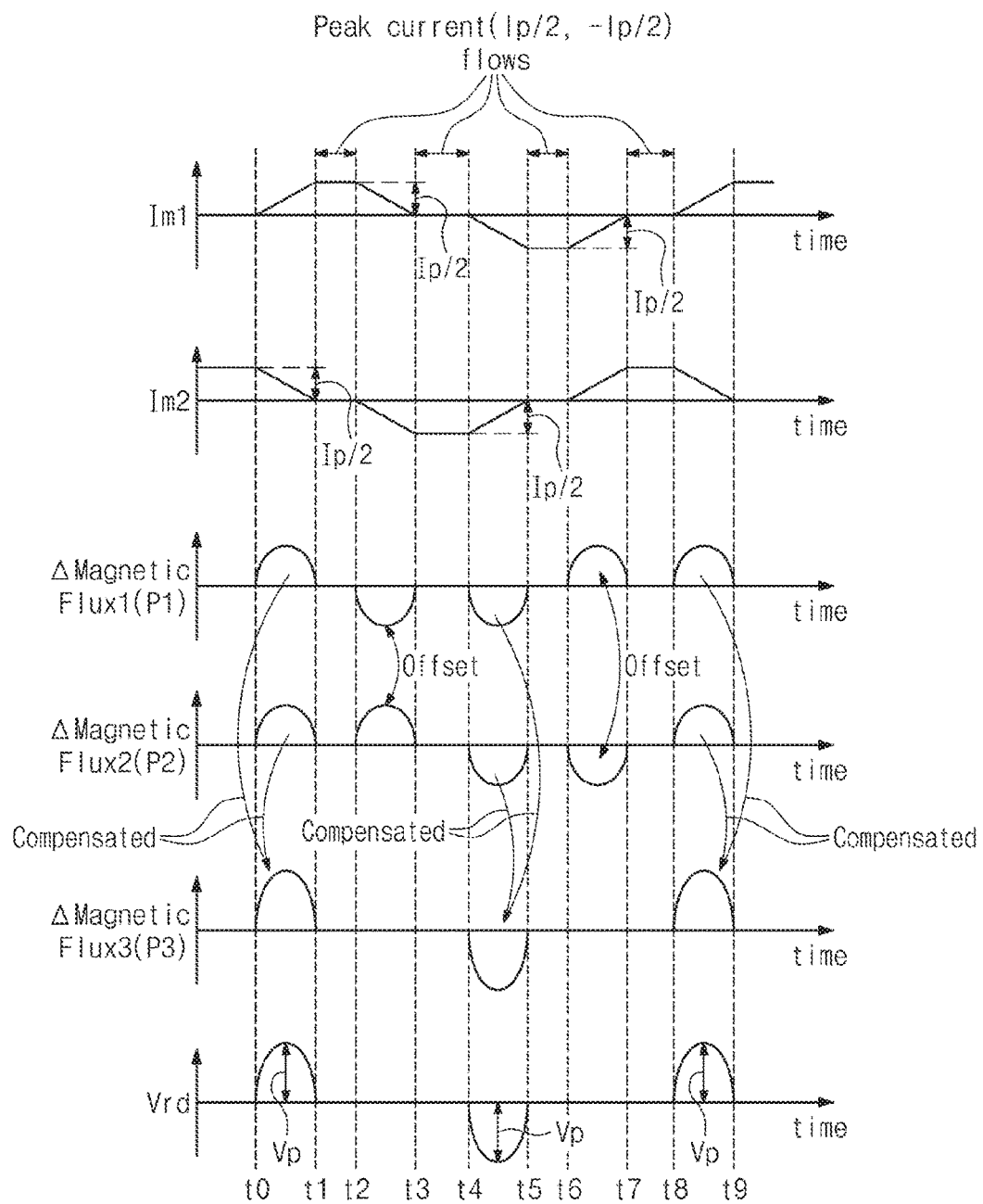
FIG. 17 is a timing diagram for describing an operation of the MST device according to another example embodiment of the inventive concepts.
Figure 18:
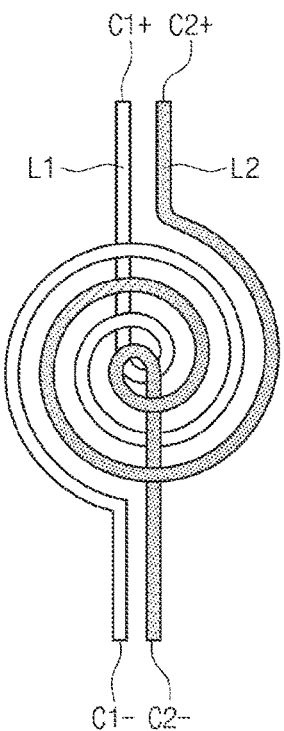
FIGS. 18 and 19 are views illustrating configurations of the first coil and the second coil according to another example embodiment of the inventive concepts.
Figure 19:
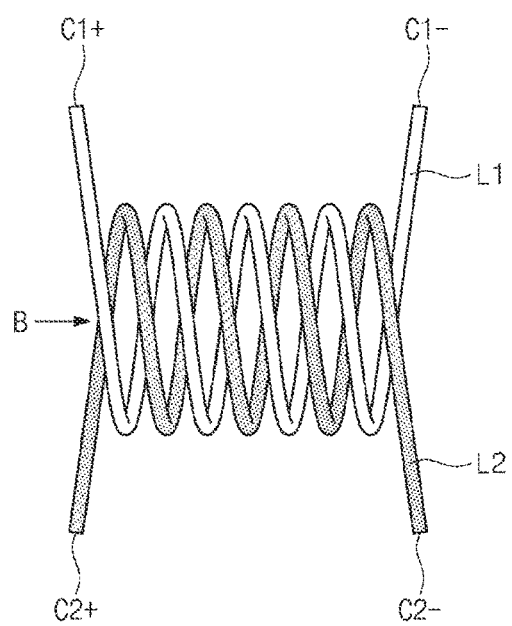

Also, it is assumed that the first magnetic field B1 is generated in a clockwise direction by the first MST current Im1 flowing in the reference direction and the second magnetic field B2 is generated in the clockwise direction by the second MST current Im2 flowing in the reference direction. In FIG. 4, the first coil L1 is configured such that the first magnetic field B1 of the clockwise direction is generated by the first MST current Im1 of the reference direction. Also, the second coil L2 is configured such that the second magnetic field B2 of the clockwise direction is generated by the second MST current Im2 of the reference direction. In the example embodiments of FIGS. 4 to 16, it is assumed that a direction in which the first coil L1 is wound is the same as a direction in which the second coil L2 is wound. In FIGS. 17 to 19, an example embodiment in which a direction in which the first coil L1 is wound is opposite to a direction in which the second coil L2 is wound will be described.

In FIG. 6, a magnetic flux change is illustrated as an indicator for representing a change in each of the first magnetic field B1 and the second magnetic field B2. The change in the first magnetic field B1 is represented by the first magnetic flux change P1, and the change in the second magnetic field B2 is represented by the second magnetic flux change P2. Also, a change in the third magnetic field B3 is represented by the third magnetic flux change P3. The read voltage Vrd is induced at the POS device 200 by the third magnetic flux change P3. That is, a signal is transmitted from the MST device 100 to the POS device 200 in the form of the third magnetic flux change P3. An operation of the MST device 100 according to the example embodiment of FIG. 6 is as follows.

From t0 to t1, the first magnetic flux change P1 occurs to compensate for the second magnetic flux change P2. In detail, the first transmitter 110 operate such that the first MST current Im1 not flowing before t0 increases in the reference direction. At t1, the amount of the first MST current Im1 flowing in the reference direction is "Ip/2". From t0 to t1, the positive first magnetic flux change P1 occurs by the change in the first MST current Im1. Also, the second transmitter 120 operate such that the amount of the second MST current Im2 flowing in the opposite direction before t0 decreases. At t1, the amount of the second MST current Im2 is "0". The positive second magnetic flux change P2 occurs by the change in the second MST current Im2.

The first magnetic flux change P1 and the second magnetic flux change P2 overlap each other, and thus, the positive magnetic flux change P3 occurs. The third magnetic flux change P3 is transmitted to the POS device 200. The positive read voltage Vrd is induced at the POS device 200 by the mutual magnetic coupling. In FIG. 6, the maximum magnitude of the read voltage Vrd is illustrated by "Vp". As a result, the MST device 100 transmits the MST signal to the POS device 200 through the third magnetic flux change P3. The positive read voltage Vrd is induced at the POS device 200 by the transmitted MST signal.

From t1 to t2, the first MST current Im1 having a maximum current amount Ip/2 flows to the first coil L1 in the reference direction. Since the direction or the amount of the first MST current Im1 does not change, the first magnetic flux change P1 do not occur. The second MST current Im2 does not flow. Since the direction or the amount of the second MST current Im2 does not change, the second magnetic flux change P2 do not occur. Accordingly, the third magnetic flux change P3 does not occur. As a result, from t1 to t2, the read voltage Vrd is not induced at the POS device 200.

From t0 to t2, as illustrated in FIG. 6, the first transmitter 110 may operate depending on various example embodiments for the purpose of generating the first MST current Im1. Various example embodiments associated with an operation of the first transmitter 110 from t0 to t2 will be described with reference to FIGS. 7 to 9. An operation of the second transmitter 120 from t0 to t2 is substantially the same as an operation of the first transmitter 110 from t6 to t8. Accordingly, for convenience of description, a description associated with the operation of the second transmitter 120 from t0 to t2 is omitted. An operation of the first transmitter 110 from t6 to t8 will be described below.

From t2 to t3, the first magnetic flux change P1 occurs to offset the second magnetic flux change P2. In detail, the first transmitter 110 operate such that the first MST current Im1 flowing in the reference direction decreases. At t3, the amount of the first MST current Im1 is "0". From t2 to t3, the negative first magnetic flux change P1 occurs by the change in the first MST current Im1. Also, the second transmitter 120 operate such that the amount of the second MST current Im2 flowing in the reference direction increases. At t3, the amount of the second MST current Im2 is "Ip/2". The positive second magnetic flux change P2 occurs by the change in the second MST current Im2. From t2 to t3, the first magnetic flux change P1 and the second magnetic flux change P2 are offset, and thus, the third magnetic flux change P3 does not occur. Accordingly, the read voltage Vrd is not induced at the POS device 200.

From t3 to t4, the first MST current Im1 does not flow. Since the direction or the amount of the first MST current Im1 does not change, the first magnetic flux change P1 do not occur. The second MST current Im2 having a maximum current amount Ip/2 flows to the second coil L2 in the reference direction. Since the direction or the amount of the second MST current Im2 does not change, the second magnetic flux change P2 does not occur. Accordingly, the third magnetic flux change P3 does not occur. As a result, from t3 to t4, the read voltage Vrd is not induced at the POS device 200.

From t2 to t4, as illustrated in FIG. 6, the first transmitter 110 may operate depending on various example embodiments for the purpose of generating the first MST current Im1. Various example embodiments associated with an operation of the first transmitter 110 from t2 to t4 will be described with reference to FIGS. 13 to 14. An operation of the second transmitter 120 from t2 to t4 is substantially the same as an operation of the first transmitter 110 from t0 to t2. Accordingly, for convenience of description, a description associated with the operation of the second transmitter 120 from t2 to t4 is omitted.

From t4 to t5, the first magnetic flux change P1 occurs to compensate for the second magnetic flux change P2. In detail, the first transmitter 110 operate such that the first MST current Im1 not flowing from t3 to t4 increases in the opposite direction. At t5, the first MST current Im1 having a maximum current amount Ip/2 flows to the first coil L1 in the opposite direction. From t4 to t5, the negative first magnetic flux change P1 occurs by the change in the first MST current Im1. Also, the second transmitter 120 operates such that the amount of the second MST current Im2 flowing in the reference direction from t3 to t4 decreases. At t5, the amount of the second MST current Im2 is "0". The negative second magnetic flux change P2 occurs by the change in the second MST current Im2. From t4 to t5, the first magnetic flux change P1 and the second magnetic flux change P2 overlap each other, and thus, the negative third magnetic flux change P3 occurs. The third magnetic flux change P3 is transmitted to the POS device 200. The negative read voltage Vrd is induced at the POS device 200 by the mutual magnetic coupling.

From t5 to t6, the first MST current Im1 having a maximum current amount Ip/2 flows to the first coil L1 in the opposite direction. Since the direction or the amount of the first MST current Im1 does not change, the first magnetic flux change P1 do not occur. The second MST current Im2 does not flow. Since the direction or the amount of the second MST current Im2 does not change, the second magnetic flux change P2 does not occur. Accordingly, the third magnetic flux change P3 does not occur. As a result, from t5 to t6, the read voltage Vrd is not induced at the POS device 200.

From t4 to t6, as illustrated in FIG. 6, the first transmitter 110 may operate depending on various example embodiments for the purpose of generating the first MST current Im1. Various example embodiments associated with an operation of the first transmitter 110 from t4 to t6 will be described with reference to FIGS. 10 to 12. An operation of the second transmitter 120 from t4 to t6 is substantially the same as an operation of the first transmitter 110 from t2 to t4. Accordingly, for convenience of description, a description associated with the operation of the second transmitter 120 from t4 to t6 is omitted.

From t6 to t7, the first magnetic flux change P1 occurs to offset the second magnetic flux change P2. In detail, the first transmitter 110 operates such that the first MST current Im1 flowing in the opposite direction decreases. At t7, the first MST current Im1 does not flow. The positive first magnetic flux change P1 occurs by the change in the first MST current Im1. Also, the second transmitter 120 operates such that the amount of the second MST current Im2 flowing in the opposite direction increases. At t7, the second MST current Im2 having a maximum current amount Ip/2 flows in the opposite direction. From t6 to t7, the negative second magnetic flux change P2 occurs by the change in the second MST current Im2. From t6 to t7, the first magnetic flux change P1 and the second magnetic flux change P2 are offset, and thus, the third magnetic flux change P3 does not occur. Accordingly, the read voltage Vrd is not induced at the POS device 200.

From t7 to t8, the first MST current Im1 does not flow. Since the direction or the amount of the first MST current Im1 does not change, the first magnetic flux change P1 do not occur. The second MST current Im2 having a maximum current amount Ip/2 flows to the second coil L2 in the opposite direction. Since the direction or the amount of the second MST current Im2 does not change, the second magnetic flux change P2 does not occur. Accordingly, the third magnetic flux change P3 does not occur. As a result, from t7 to t8, the read voltage Vrd is not induced at the POS device 200.

From t6 to t8, as illustrated in FIG. 6, the first transmitter 110 may operate depending on various example embodiments for the purpose of generating the first MST current Im1. Various example embodiments associated with an operation of the first transmitter 110 from t6 to t8 will be described with reference to FIGS. 13 to 14. An operation of the second transmitter 120 from t6 to t8 is substantially the same as an operation of the first transmitter 110 from t4 to t6. Accordingly, for convenience of description, a description associated with the operation of the second transmitter 120 from t6 to t8 is omitted.

An operation of the MST device 100 after t8 is the same as described from t0 to t8. Also, a change in the first MST current Im1, a change in the second MST current Im2, the first to third magnetic flux changes P1 to P3, and a change in the read voltage Vrd after t8 through an operation of the MST device 100 are the same as described from t0 to t8, and a description thereof is thus omitted.

Referring to FIG. 6, while the power supply voltage Vbat is maintained, from t1 to t2 and from t5 to t6, the first transmitter 110 operates such that the first MST current Im1 having a maximum current amount Ip/2 flows. Also, from t3 to t4 and from t7 to t8, the second transmitter 120 operates such that the second MST current Im2 having a maximum current amount Ip/2 flows. Compared with the example embodiment of FIGS. 1 to 3, the MST device 100 may reduce the maximum current amount and power consumption to almost the half. In addition, the MST device 100 may maintain the magnitude of a signal being transmitted to the POS device 200.

FIGS. 7 to 14 are views for describing an operation of a first transmitter illustrated in FIG. 4. FIGS. 7 to 14 will be described with reference to FIGS. 4 to 6. Example embodiments associated with an operation of the first transmitter 110 from t0 to t2 will be described with reference to FIGS. 7 to 9.

Figure 7:
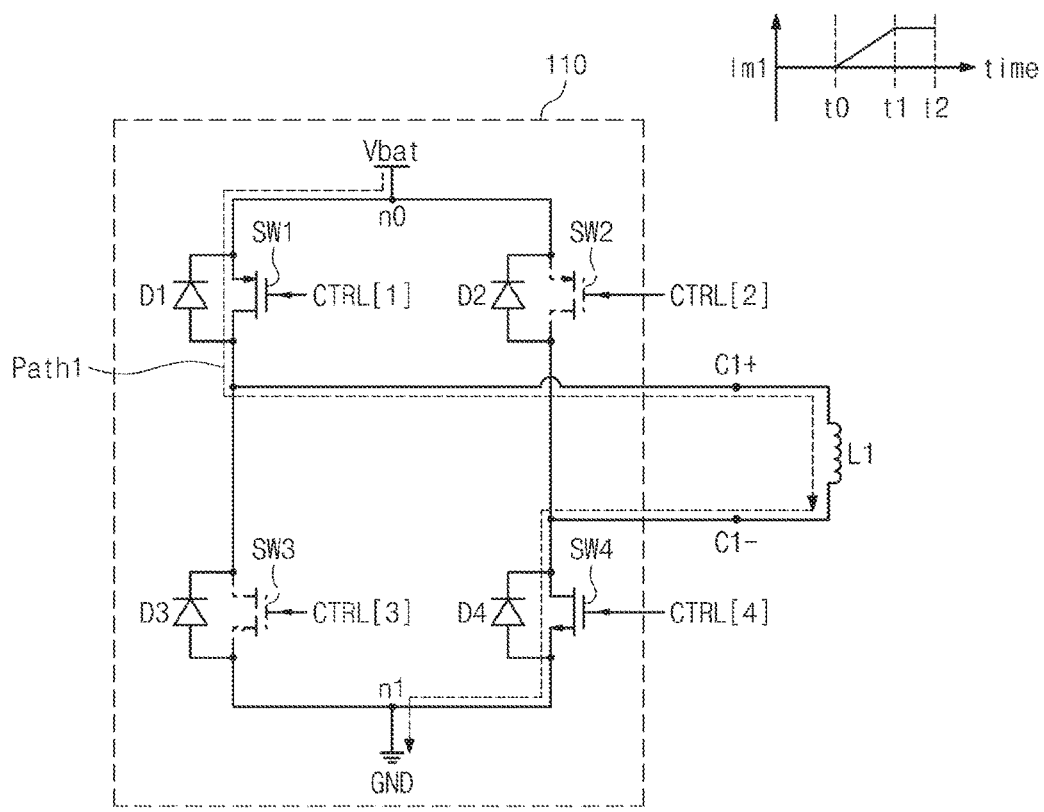
FIGS. 7 to 14 are views for describing an operation of a first transmitter illustrated in FIG. 4.

Referring to the example embodiment of FIG. 7, from t0 to t2, the first switch SW1 and the fourth switch SW4 are turned on, and the second switch SW2 and the third switch SW3 are turned off. In this case, a current path from the power supply voltage Vbat to a ground voltage GND is formed through the first switch SW1, the first coil L1, and the fourth switch SW4. In FIG. 7, the current path is illustrated by a first path Path1. The first MST current Im1 flows through the first path Path1 in the reference direction. From t0 to t1, the first MST current Im1 may increase along a slope determined by an inductance of the first coil L1 and a parasitic resistance on the first path Path1. The first magnetic flux change P1 occurs by the change in the first MST current Im1. At t1, the amount of the first MST current Im1 is Ip/2. From t1 to t2, the first MST current Im1 maintains a maximum current amount Ip/2.

Figure 8:
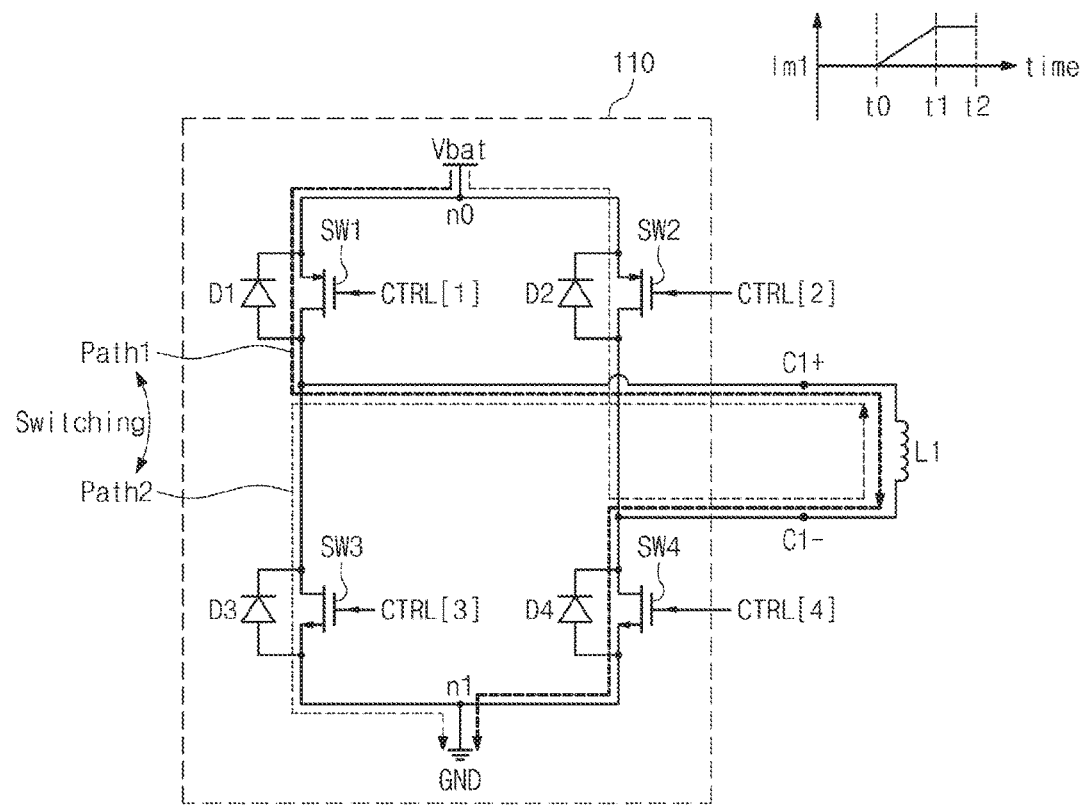

Referring to FIG. 8, from t0 to t1, the first transmitter 110 may alternately perform an operation of forming the first path Path1 and an operation of forming a second path Path2. The second path Path2 means a current path formed from the power supply voltage Vbat to the ground voltage GND through the turned-on second switch SW2, the first coil L1, and the turned-on third switch SW3. If the first path Path1 is formed, the first MST current Im1 flows in the reference direction. If the second path Path2 is formed, the first MST current Im1 flows in the opposite direction.

In the example embodiment of FIG. 8, the transmitter 110 operates such that a time when the first path Path1 is maintained is longer than a time when the second path Path2 is maintained. Accordingly, from t0 to t1, the first MST current Im1 flowing in the reference direction increases. For example, from t0 to t1, switching between the first path Path1 and the second path Path2 is repeated a plurality of times. Since a time when the first path Path1 is maintained is longer than a time when the second path Path2 is maintained, the first MST current Im1 flowing in the reference direction may sequentially increase whenever switching is repeated an even number of times. Also, if a ratio of a time when the first path Path1 is maintained to a time when the second path Path2 is maintained is adjusted, a speed at which the first MST current Im1 flowing in the reference direction increases may be adjusted. As a result, the first transmitter 110 may adjust the increasing speed of the first MST current Im1 to adjust the magnitude of the first magnetic flux change P1.

Operations of the first to fourth switches SW1 to SW4 may be respectively controlled by the control signals CTRL [1] to CTRL[4]. Although not illustrated in FIG. 8, the control signals CTRL[1] to CTRL[4] may be provided by a controller (refer to FIG. 20) or a main processor (refer to FIG. 21). That is, referring to the example embodiment of FIG. 8, from t0 to t1, the controller or the main processor may adjust the increasing speed of the first MST current Im1 for the purpose of adjusting a quantity by which the first magnetic flux change P1 and the second magnetic flux change P2 overlap each other.

Also, referring to the example embodiment of FIG. 8, from t1 to t2, the first transmitter 110 may alternately perform the operation of forming the first path Path1 and the operation of forming the second path Path2. From t1 to t2, if a ratio of a time when the first path Path1 is maintained to a time when the second path Path2 is adjusted whenever switching is performed, a maximum current amount of the first MST current Im1 may be adjusted. For example, in the case where a maximum current amount of the first MST current Im1 is greater than a maximum current amount of the second MST current Im2, the first transmitter 110 may operate such that a time when the second path Path2 is maintained becomes longer than a time when the first path Path1 is maintained. A maximum current amount of the first MST current Im1 may decrease by an operation of the first transmitter 110. Referring to the example embodiment of FIG. 8, from t1 to t2, the controller or the main processor may adjust the first MST current Im1 such that a maximum current amount of the first MST current Im1 flowing in the reference direction is matched with a maximum current amount of the second MST current Im2.

Figure 9:
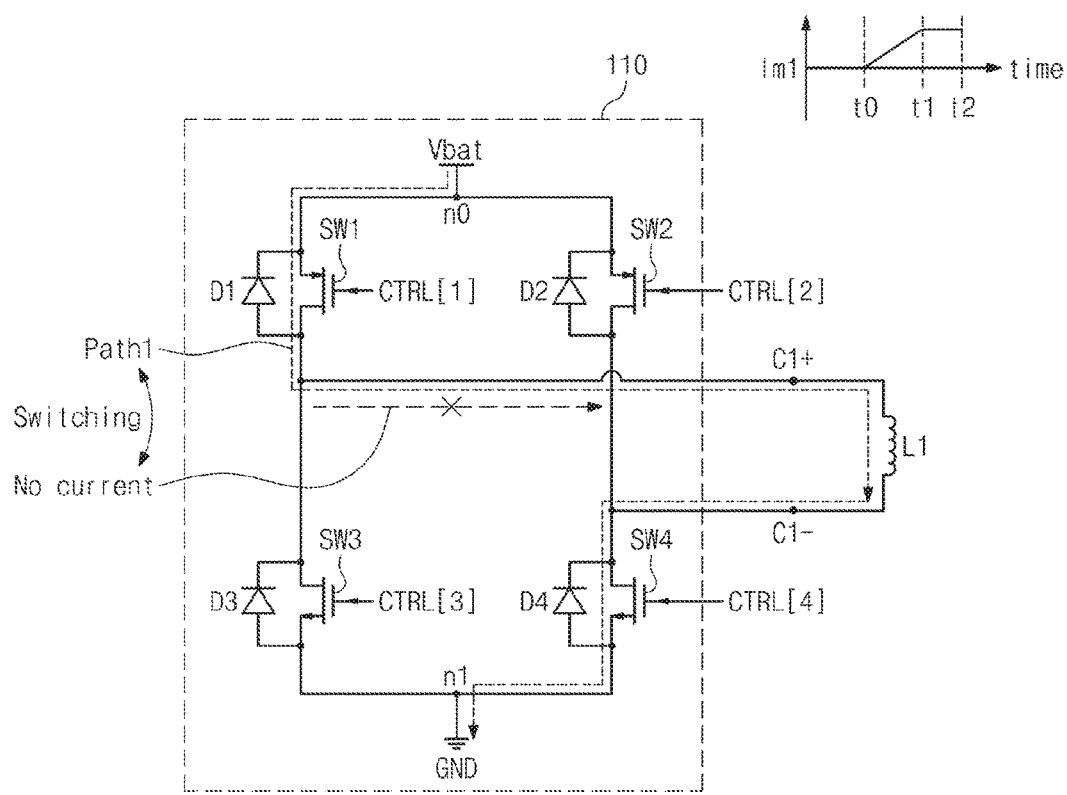
Figure 13:
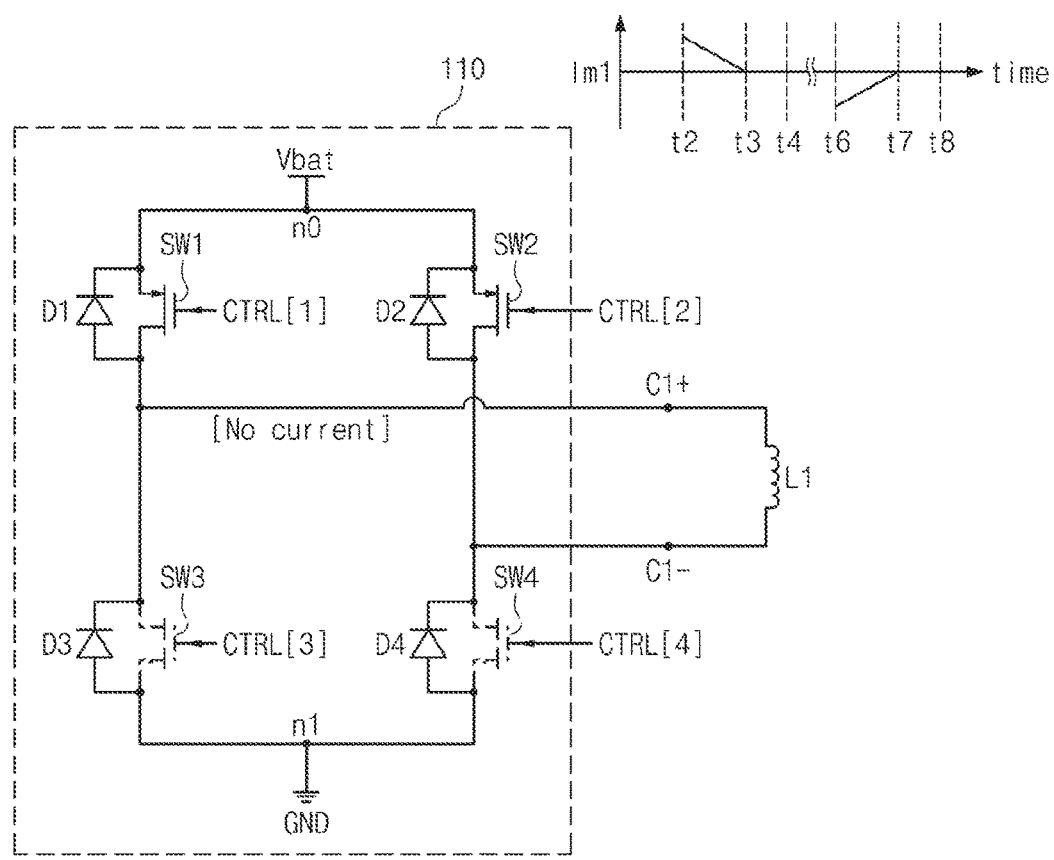
Figure 14:
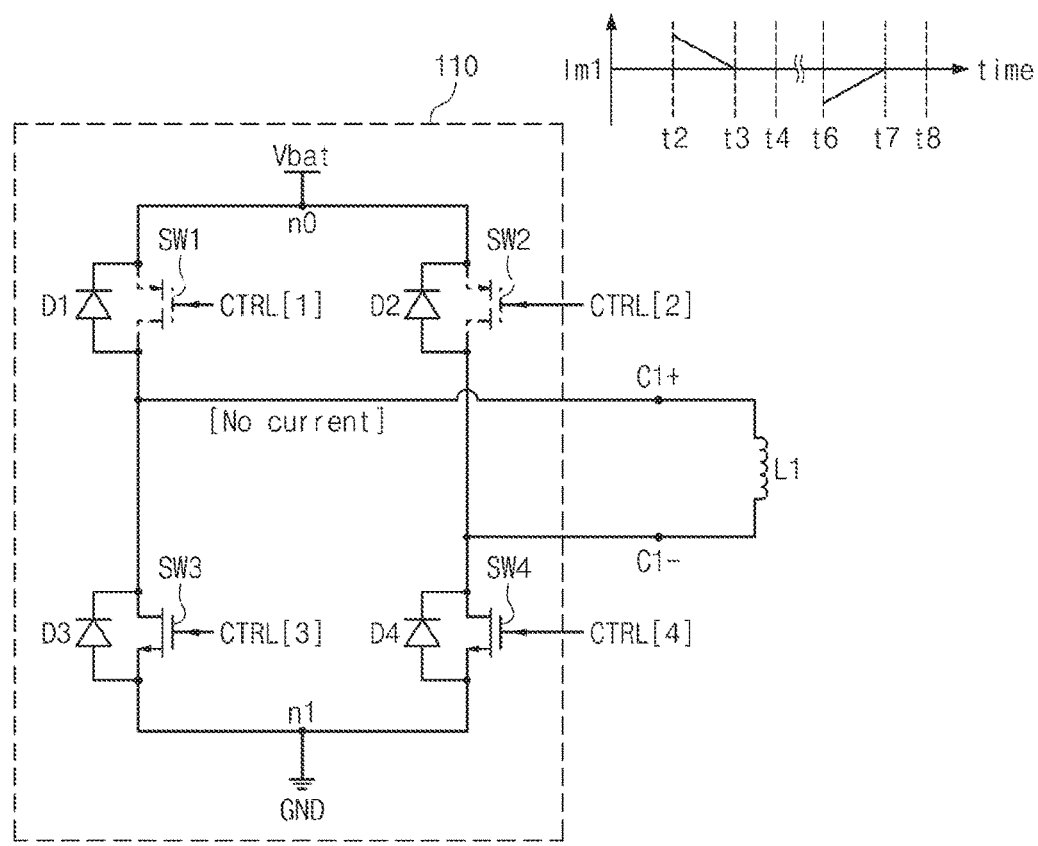

Referring to an example embodiment of FIG. 9, from t0 to t1, the first transmitter 110 may alternately perform the operation of forming the first path Path1 and an operation of blocking the first MST current Im1. If the first path Path1 is formed, the first MST current Im1 flows in the reference direction. The first MST current Im1 may be blocked by two methods. For example, the first switch SW1 and the second switch SW2 are turned on, and the third switch SW3 and the fourth switch SW4 are turned off. In this case, the terminals C1+ and C1− may have a level of the power supply voltage Vbat. Since no potential difference is between the terminal C1+ and the terminal C1−, the first MST current Im1 does not flow. As another example embodiment, the third switch SW3 and the fourth switch SW4 are turned on, and the first switch SW1 and the second switch SW2 are turned off. In this case, the terminals C1+ and C1− may have a level of the ground voltage GND. Since no potential difference is between the terminal C1+ and the terminal C1−, the first MST current Im1 does not flow. An example embodiment in which the first MST current Im1 is blocked is illustrated in FIGS. 13 and 14.

The example embodiment of FIG. 9 is similar to the example embodiment of FIG. 8. In the example embodiment of FIG. 9, the first transmitter 110 operates such that a time when the first path Path1 is maintained is longer than a time to block the first MST current Im1. In this case, from t0 to t1, the first MST current Im1 flowing in the reference direction increases. For example, from t0 to t1, switching between an operation in which the first path Path1 is formed and an operation of blocking the first MST current Im1 repeated a plurality of times. Since a time when the first path Path1 is maintained is longer than a time to block the first MST current Im1, the first MST current Im1 flowing in the reference direction may sequentially increase whenever the switching is repeated an even number of times. As in the example embodiment of FIG. 8, in the example embodiment of FIG. 9, the controller or the main processor may adjust the increasing speed of the first MST current Im1 to adjust the magnitude of the first magnetic flux change P1. Accordingly, from t0 to t1, the controller or the main processor may adjust the increasing speed of the first MST current Im1 for the purpose of adjusting a quantity by which the first magnetic flux change P1 and the second magnetic flux change P2 overlap each other.

Also, referring to the example embodiment of FIG. 9, from t1 to t2, the first transmitter 110 may alternately perform the operation of forming the first path Path1 and the operation of blocking the first MST current Im1. In this case, by adjusting a ratio of a time when the first path Path1 is maintained to a time to block the first MST current Im1 whenever the switching is performed, the controller or the main processor may adjust a maximum current amount of the first MST current Im1 flowing from t1 to t2. That is, referring to the example embodiment of FIG. 9, from t1 to t2, the controller or the main processor may adjust the first MST current Im1 such that a maximum current amount of the first MST current Im1 flowing in the reference direction is matched with a maximum current amount of the second MST current Im2.

Figure 10:
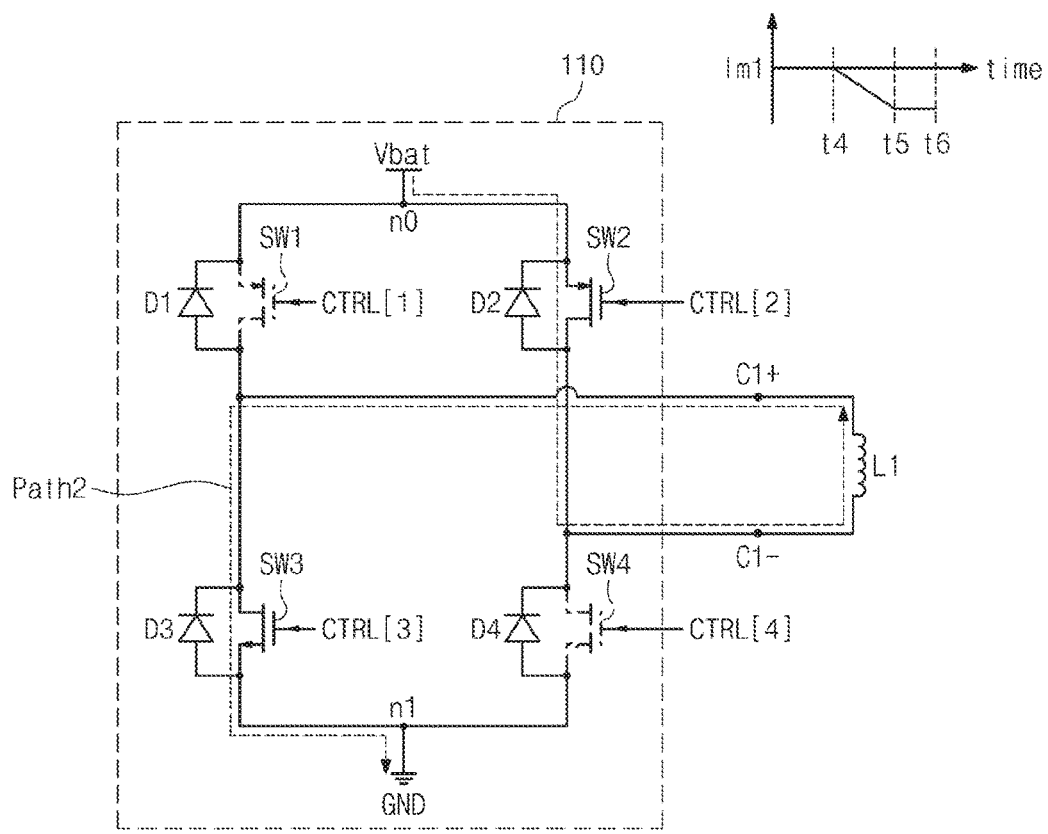

Example embodiments associated with an operation of the first transmitter 110 from t4 to t6 will be described with reference to FIGS. 10 to 12. Referring to an embodiment of FIG. 10, from t4 to t6, the second switch SW2 and the third switch SW3 are turned on, and the first switch SW1 and the fourth switch SW4 are turned off. In this case, the second path Path2 is formed. The first MST current Im1 flows through the second path Path2 in the opposite direction. From t4 to t6, the first MST current Im1 flowing in the opposite direction may increase along a slope determined by an inductance of the first coil L1 and a parasitic resistance on the second path Path2. The first magnetic flux change P1 occurs by the change in the first MST current Im1. At t5, the amount of the first MST current Im1 of the opposite direction is Ip/2. From t5 to t6, the first MST current Im1 of a maximum current amount Ip/2 flows in the opposite direction.

Figure 11:
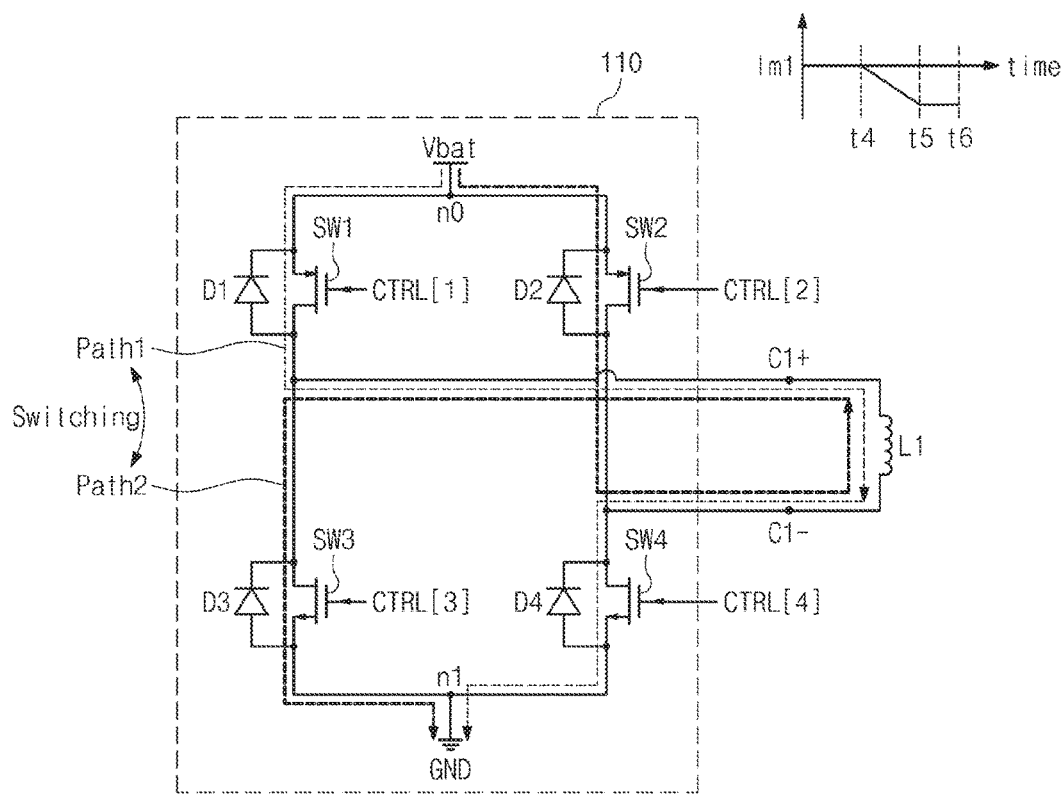

Referring to an example embodiment of FIG. 11, from t4 to t5, the first transmitter 110 may alternately perform the operation of forming the first path Path1 and the operation of forming the second path Path2. The example embodiment of FIG. 11 is similar to the example embodiment of FIG. 8. However, unlike the example embodiment of FIG. 8, the transmitter 110 operates such that a time when the second path Path2 is maintained is longer than a time when the first path Path1 is maintained. In this case, from t4 to t5, the first MST current Im1 flowing in the opposite direction increases. For example, from t4 to t5, switching between the first path Path1 and the second path Path2 is repeated a plurality of times. Since a time when the second path Path2 is maintained is longer than a time when the first path Path1 is maintained, the first MST current Im1 flowing in the opposite direction may sequentially increase whenever the switching is repeated an even number of times. If a ratio of a time when the first path Path1 is maintained to a time when the second path Path2 is maintained is adjusted whenever the switching is made, the increasing speed of the first MST current Im1 flowing in the opposite direction may be adjusted. Accordingly, the controller or the main processor may adjust the increasing speed of the first MST current Im1 to adjust the magnitude of the first magnetic flux change P1. As a result, as in the example embodiment of FIG. 8, from t4 to t5, the controller or the main processor may adjust the increasing speed of the first MST current Im1 flowing in the opposite direction for the purpose of adjusting a quantity by which the first magnetic flux change P1 and the second magnetic flux change P2 overlap each other.

Also, referring to the example embodiment of FIG. 11, from t5 to t6, the first transmitter 110 may alternately perform the operation of forming the first path Path1 and the operation of forming a second path Path2. In this case, if a ratio of a time when the first path Path1 is maintained to a time when the second path Path2 is maintained is adjusted whenever the switching is made, the increasing speed of the first MST current Im1 flowing from t5 to t6 may be adjusted. Referring to the example embodiment of FIG. 11, from t5 to t6, the controller or the main processor may adjust the first MST current Im1 such that a maximum current amount of the first MST current Im1 flowing in the opposite direction is matched with a maximum current amount of the second MST current Im2.

Figure 12:
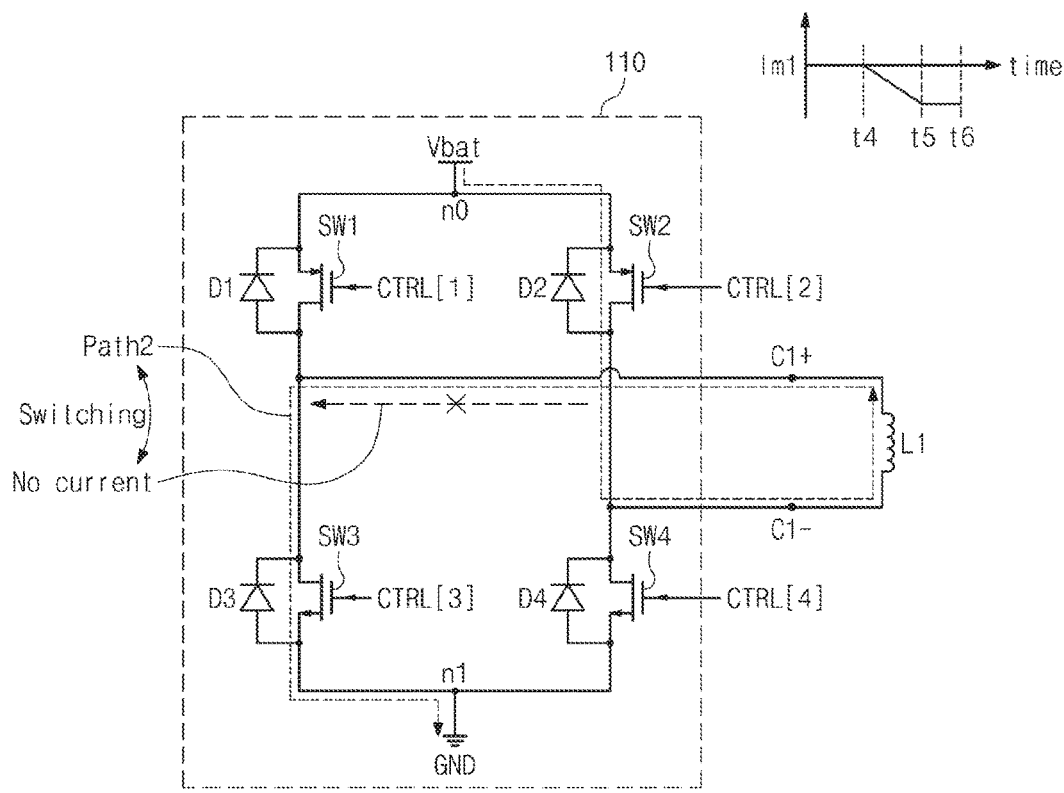

Referring to the example embodiment of FIG. 12, from t4 to t5, the first transmitter 110 may alternately perform the operation of forming the second path Path2 and an operation of blocking the first MST current Im1. If the second path Path2 is formed, the first MST current Im1 flows in the opposite direction. The operation of blocking the first MST current Im1 is the same as described with reference to FIG. 9.

The example embodiment of FIG. 12 is similar to the example embodiment of FIG. 9. In the example embodiment of FIG. 12, the first transmitter 110 operates such that a time when the second path Path2 is maintained is longer than a time to block the first MST current Im1. In this case, from t4 to t5, the first MST current Im1 flowing in the opposite direction increases. For example, from t4 to t5, switching between the operation in which the second path Path2 is formed and the operation of blocking the first MST current Im1 repeated a plurality of times. Since a time when the second path Path2 is maintained is longer than a time to block the first MST current Im1, the first MST current Im1 flowing in the opposite direction may sequentially increase whenever the switching is repeated an even number of times. If a ratio of a time when the second path Path2 is maintained to a time to block the first MST current Im1 is adjusted whenever the switching is made, the increasing speed of the first MST current Im1 flowing in the opposite direction may be adjusted. As a result, the controller or the main processor may adjust the increasing speed of the first MST current Im1 to adjust the magnitude of the first magnetic flux change P1.

Also, referring to the example embodiment of FIG. 12, from t5 to t6, the first transmitter 110 may alternately perform the operation of forming the second path Path2 and the operation of blocking the first MST current Im1. In this case, if a ratio of a time when the second path Path2 is maintained to a time to block the first MST current Im1 is adjusted whenever the switching is made, a maximum current amount of the first MST current Im1 flowing from t5 to t6 may be adjusted. As a result, from t5 to t6, the controller or the main processor may adjust the first MST current Im1 such that a maximum current amount of the first MST current Im1 flowing in the opposite direction is matched with a maximum current amount of the second MST current Im2.

Embodiments associated with an operation of the first transmitter 110 from t2 to t4 and from t6 to t8 will be described with reference to FIGS. 13 to 14. Referring to the example embodiment of FIG. 13, from t2 to t4 and from t6 to t8, the first switch SW1 and the second switch SW2 are turned on, and the third switch SW3 and the fourth switch SW4 are turned off. In this case, the terminals C1+ and C1− may have a level of the power supply voltage Vbat.

Referring to the example embodiment of FIG. 14, from t2 to t4 and from t6 to t8, the third switch SW3 and the fourth switch SW4 are turned on, and the first switch SW1 and the second switch SW2 are turned off. In this case, the terminals C1+ and C1− may have a level of the ground voltage GND.

Referring to the example embodiment of FIGS. 13 and 14, from t2 to t3, the first MST current Im1 flowing in the reference direction may decrease along a slope determined by an inductance of the first coil L1 and a parasitic resistance on the first path Path1. From t3 to t4, since there is no potential difference between the terminal C1+ and the terminal C1−, the first MST current Im1 does not flow. Also, from t6 to t7, the first MST current Im1 flowing in the opposite direction may decrease along a slope determined by an inductance of the first coil L1 and a parasitic resistance on the second path Path2. From t7 to t8, since no potential difference is between the terminal C1+ and the terminal C1−, the first MST current Im1 does not flow. From t2 to t3 and from t6 to t7, the first magnetic flux change P1 occurs by the change in the first MST current Im1.

Although not illustrated in FIGS. 13 and 14, as another embodiment, a slope along which the first MST current Im1 flowing in the reference direction from t2 to t3 decreases may be adjusted by the example embodiment described with reference to FIG. 11 or 12. Alternatively, a slope along which the first MST current Im1 flowing in the opposite direction from t6 to t7 decreases may be adjusted by the example embodiment described with reference to FIG. 8 or 9.

Embodiments associated with the detailed operation of the MST device 100 are described above. However, the inventive concept is not limited to the above-described embodiments. For example, for each interval from t0 to t8, the transmitter 110 may operate depending on a method in which the example embodiments described with reference to FIGS. 7 to 14 are combined. For example, from t0 to t2, the transmitter 110 may operate depending on a method in which the example embodiments described with reference to FIGS. 7 to 9 are combined. Also, from t4 to t6, the transmitter 110 may operate depending on a method in which the example embodiments described with reference to FIGS. 10 to 12 are combined.

Figure 15:
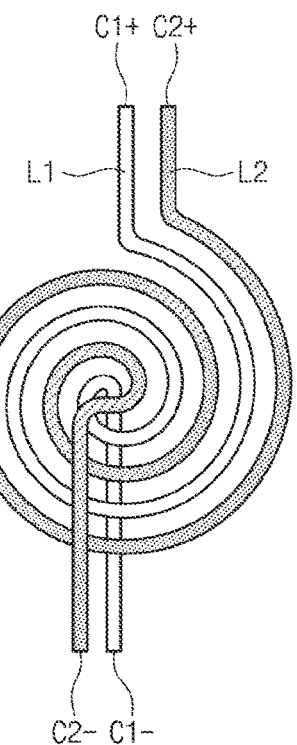
FIGS. 15 and 16 are views illustrating configurations of a first coil and a second coil illustrated in FIG. 4.
Figure 16:
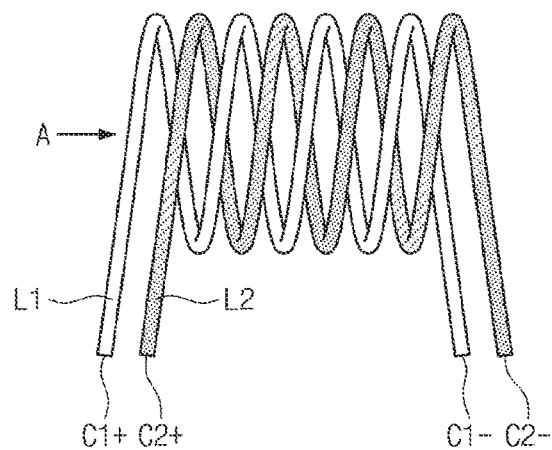

FIGS. 15 and 16 are views illustrating configurations of a first coil and a second coil illustrated in FIG. 4.

Referring to FIGS. 15 and 16, at least some of conducting wires of the first coil L1 may be formed to be located between conducting wires of the second coil L2. The reason is that a change in the first magnetic field B1 generated in the first coil L1 and a change in the second magnetic field B2 generated in the second coil L2 are offset in an interval where the MST device 100 does not provide an MST signal to the POS device 200.

Referring to FIG. 15, the first coil L1 and the second coil L2 may be configured in a spiral shape on a plane. Also, the conducting wires of the first coil L1 and the conducting wires of the second coil L2 are located to cross each other on the plane. In the case where the first MST current Im1 flows from the terminal C1+ to the terminal C1−, the first magnetic field B1 generated in the first coil L1 may be generated in an inward direction perpendicular to the drawing. Also, in the case where the second MST current Im2 flows from the terminal C2+ to the terminal C2−, the second magnetic field B2 generated in the second coil L2 may be generated in an inward direction perpendicular to the drawing. The example embodiment is illustrated in FIG. 15 as the first coil L1 and the second coil L2 are wound in a clockwise direction. However, example embodiments may not be limited thereto. For example, the first coil L1 and the second coil L2 may be wound in a counterclockwise direction. In this case, the first magnetic field B1 and the second magnetic field B2 may be generated in an outward direction perpendicular to the drawing.

Referring to FIG. 16, the first coil L1 and the second coil L2 may be configured in a shape to wind a virtual pillar. Also, the conducting wires of the first coil L1 are located to intersect the conducting wires of the second coil L2 on a three-dimensional space. In the case where the first MST current Im1 flows from the terminal C1+ to the terminal C1−, the first magnetic field B1 generated in the first coil L1 may be generated in a direction opposite to a "A" direction. In the case where the second MST current Im2 flows from the terminal C2+ to the terminal C2−, the second magnetic field B2 generated in the second coil L2 may be generated in the direction opposite to the "A" direction. Referring to FIG. 16, an example embodiment is illustrated as the first coil L1 and the second coil L2 are wound in a counterclockwise direction when the first coil L1 and the second coil L2 are viewed in the "A" direction. However, example embodiments may not be limited thereto. For example, the first coil L1 and the second coil L2 may be wound in a clockwise direction. In this case, the first magnetic field B1 and the second magnetic field B2 may be generated in the "A" direction.

Referring to the example embodiment of FIGS. 15 and 16, the first coil L1 may be formed with substantially the same shape and length as the second coil L2. Also, the first coil L1 and the second coil L2 may be configured to be substantially overlapped. In addition, characteristics (an inductance, a material, etc.) of the first coil L1 may be the same as those of the second coil L2. Accordingly, through an operation of the MST device 100, a change in the first magnetic field B1 generated in the first coil L1 and a change in the second magnetic field B2 generated in the second coil L2 may be offset.

However, example embodiments of the inventive concepts are not limited to the example embodiment of FIGS. 15 to 16. FIGS. 15 and 16 are for describing an example embodiment of the first coil L1 and the second coil L2 in terms of a shape. That is, except for the shape, a configuration (a distance between the first coil L1 and the second coil L2, a thickness of each of the first coil L1 and the second coil L2, the number of turns of each of the first coil L1 and the second coil L2, etc.) of each of the first coil L1 and the second coil L2 is not limited by the example embodiment of FIGS. 15 and 16. Also, the first coil L1 and the second coil L2 may be configured to have any shape, such as a quadrangular shape or a triangular shape, in addition to a spiral shape. That is, the first coil L1 and the second coil L2 may be configured depending on various example embodiments such that a change in the first magnetic field B1 and a change in the second magnetic field B2 are offset.

In FIGS. 4 to 16, an example embodiment is illustrated having the first coil L1 and the second coil L2 wound in the same direction. However, example embodiments are not limited thereto. For example, below, an example embodiment in which the first coil L1 and the second coil L2 are wound in opposite directions will be described.

FIG. 17 is a timing diagram for describing an operation of an MST device according to another embodiment of the inventive concept. Compared with the example embodiment of FIGS. 4 to 16, an example embodiment of FIGS. 17 to 19 may be implemented such that the first coil L1 and the second coil L2 are wound in opposite directions. For example, the first coil L1 is configured such that the first magnetic field B1 of the clockwise direction is generated by the first MST current Im1 of the reference direction. In contrast, the second coil L2 is configured such that the second magnetic field B2 of the counterclockwise direction is generated by the second MST current Im2 of the reference direction. As another embodiment, each of the first coil L1 and the second coil L2 may be configured in a direction opposite to a direction of the above-described example.

A change in the first MST current Im1, a change in the second MST current Im2, a first magnetic flux change ΔMagnetic Flux1 (hereinafter referred to as "P1"), a second magnetic flux change ΔMagnetic Flux2 (hereinafter referred to as "P2"), a third magnetic flux change ΔMagnetic Flux3 (hereinafter referred to as "P3"), and a change in a read voltage Vrd according to an operation of the MST device 100 including the above-described configuration will be described with reference to FIG. 17. Except for a direction of the second MST current Im2 and a direction of the second magnetic field B2, a change in the first MST current Im1, the first to third magnetic flux changes P1 to P3, and a change in the read voltage Vrd are the same as described with reference to FIG. 6.

From t0 to t1, the second transmitter 120 operates such that the amount of the second MST current Im2 flowing in the reference direction before t0 decreases. At t1, the amount of the second MST current Im2 is "0". In contrast to the example embodiment of FIG. 6, the positive second magnetic flux change P2 occurs as the second MST current Im2 decreases. The first magnetic flux change P1 and the second magnetic flux change P2 overlap each other, and thus, the positive third magnetic flux change P3 occurs. The positive read voltage Vrd is induced at the POS device 200 by the positive third magnetic flux change P3.

From t1 to t2, the second MST current Im2 does not flow. Since the direction or the amount of the second MST current Im2 does not change, the second magnetic flux change P2 does not occur. Also, the first magnetic flux change P1 does not occur. Accordingly, the third magnetic flux change P3 does not occur. As a result, the read voltage Vrd is not induced at the POS device 200.

From t2 to t3, the second transmitter 120 operates such that the amount of the second MST current Im2 flowing in the opposite direction increases. At t3, the amount of the second MST current Im2 flowing in the opposite direction is Ip/2. The positive second magnetic flux change P2 occurs by the change in the second MST current Im2. The first magnetic flux change P1 and the second magnetic flux change P2 are offset, and thus, the third magnetic flux change P3 does not occur. Accordingly, the read voltage Vrd is not induced at the POS device 200.

From t3 to t4, the second MST current Im2 having a current amount of Ip/2 flows to the second coil L2 in the opposite direction. Since the direction or the amount of the second MST current Im2 does not change, the second magnetic flux change P2 does not occur. Also, the first magnetic flux change P1 does not occur. Accordingly, the third magnetic flux change P3 does not occur. As a result, the read voltage Vrd is not induced at the POS device 200.

From t4 to t5, the second transmitter 120 operates such that the amount of the second MST current Im2 flowing in the opposite direction from t3 to t4 decreases. At t5, the amount of the second MST current Im2 is "0". The negative second magnetic flux change P2 occurs by the change in the second MST current Im2. The first magnetic flux change P1 and the second magnetic flux change P2 overlap each other, and thus, the negative third magnetic flux change P3 occurs. The negative read voltage Vrd is induced at the POS device 200 by the negative third magnetic flux change P3.

From t5 to t6, the second MST current Im2 does not flow. Since the direction or the amount of the second MST current Im2 does not change, the second magnetic flux change P2 does not occur. Also, the first magnetic flux change P1 does not occur. Accordingly, the third magnetic flux change P3 does not occur. As a result, the read voltage Vrd is not induced at the POS device 200.

From t6 to t7, the second transmitter 120 operates such that the amount of the second MST current Im2 of the reference direction increases. At t7, the second MST current Im2 having a current amount of Ip/2 flows in the reference direction. From t6 to t7, the negative second magnetic flux change P2 occurs by the change in the second MST current Im2. The first magnetic flux change P1 and the second magnetic flux change P2 are offset, and thus, the third magnetic flux change P3 does not occur. Accordingly, the read voltage Vrd is not induced at the POS device 200.

From t7 to t8, the second MST current Im2 having a maximum current amount Ip/2 flows to the second coil L2 in the reference direction. Since the direction or the amount of the second MST current Im2 does not change, the second magnetic flux change P2 does not occur. Also, the first magnetic flux change P1 does not occur. Accordingly, the third magnetic flux change P3 does not occur. As a result, the read voltage Vrd is not induced at the POS device 200.

An operation of the MST device 100 after t8 is the same as described from t0 to t8. Also, a change in the first MST current Im1, a change in the second MST current Im2, the first to third magnetic flux changes P1 to P3, and a change in the read voltage Vrd after t8 through an operation of the MST device 100 are the same as described from t0 to t8, and a description thereof is thus omitted.

FIGS. 18 and 19 are views illustrating configurations of a first coil and a second coil according to another embodiment of the inventive concept. Referring to FIG. 18, the first coil L1 and the second coil L2 may be configured in a spiral shape on a plane. Also, the conducting wires of the first coil L1 and the conducting wires of the second coil L2 are located to cross each other on the plane. In the case where the first MST current Im1 flows from the terminal C1+ to the terminal C1−, the first magnetic field B1 generated in the first coil L1 may be generated in an outward direction perpendicular to the drawing. Also, in the case where the second MST current Im2 flows from the terminal C2+ to the terminal C2−, the second magnetic field B2 generated in the second coil L2 may be generated in an inward direction perpendicular to the drawing.

An example embodiment is illustrated in FIG. 18 as the first coil L1 is wound in a counterclockwise direction and the second coil L2 is wound in a clockwise direction. However, embodiments may not be limited thereto. For example, the first coil L1 may be wound in a clockwise direction and the second coil L2 may be wound in a counterclockwise direction. In this case, the first magnetic field B1 may be generated in an inward direction perpendicular to the drawing, and the second magnetic field B2 may be generated in an outward direction perpendicular to the drawing Referring to FIG. 19, the first coil L1 and the second coil L2 may be configured in a shape to wind a virtual pillar. Also, the conducting wires of the first coil L1 are located to intersect the conducting wires of the second coil L2 on a three-dimensional space. In the case where the first MST current Im1 flows from the terminal C1+ to the terminal C1−, the first magnetic field B1 generated in the first coil L1 may be generated in a direction opposite to a "B" direction. In the case where the second MST current Im2 flows from the terminal C2+ to the terminal C2−, the second magnetic field B2 generated in the second coil L2 may be generated in the "B" direction.

Referring to FIG. 19, an example embodiment is illustrated as the first coil L1 is wound in a counterclockwise direction and the second coil L2 is wound in a clockwise direction, when the first coil L1 and the second coil L2 are viewed in the "B direction. However, embodiments may not be limited thereto. For example, the first coil L1 may be wound in a clockwise direction and the second coil L2 may be wound in a counterclockwise direction. In this case, the first magnetic field B1 may be generated in the "B" direction, and the second magnetic field B2 may be generated in a direction opposite to the "B" direction.

Except that the first coil L1 and the second coil L2 are wound in opposite directions, the example embodiment of FIG. 18 is the same as the example embodiments of FIG. 15, and the example embodiment of FIG. 19 is substantially the same as the example embodiment of FIG. 16.

Figure 20:
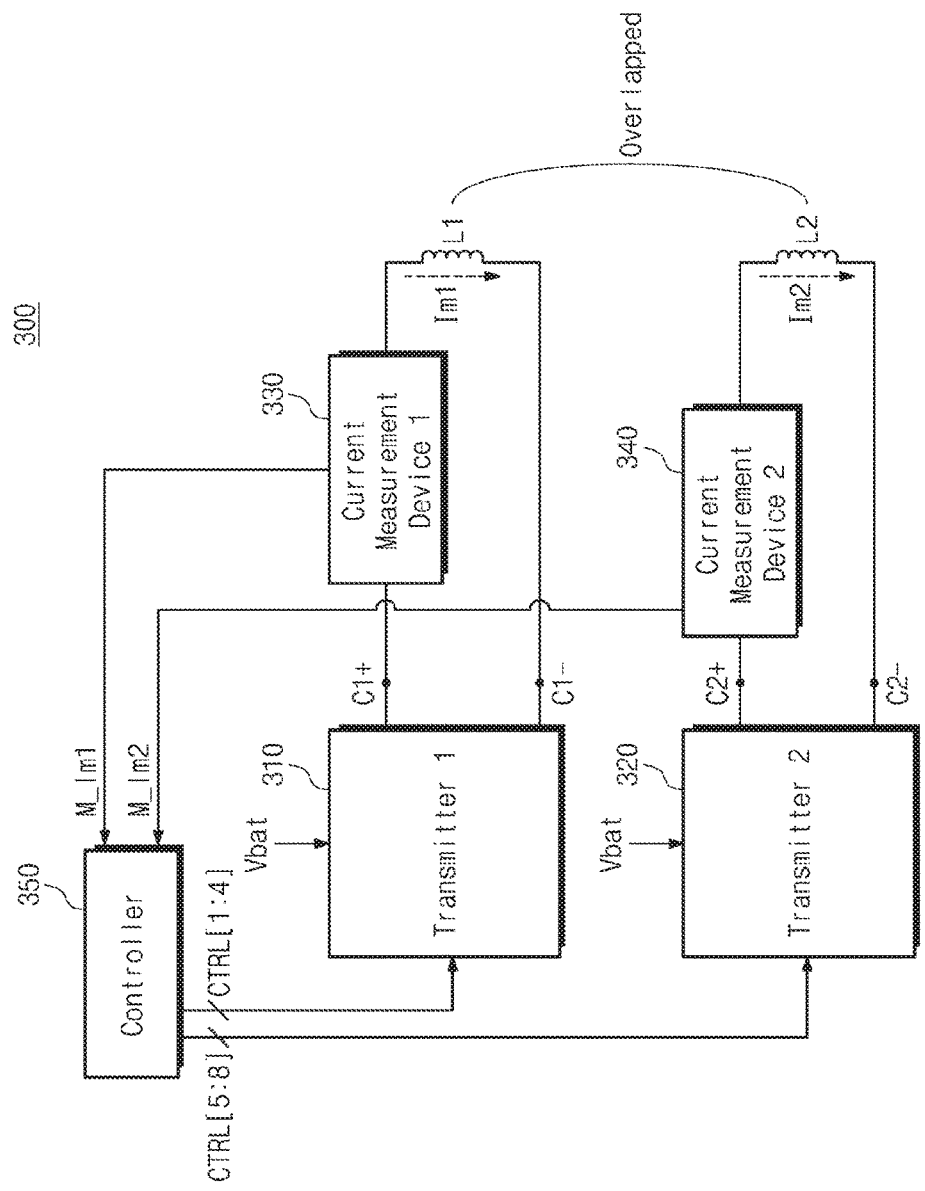
FIG. 20 is a view illustrating the MST device according to another example embodiment of the inventive concepts.

FIG. 20 is a view illustrating an MST device according to another embodiment of the inventive concept.

Referring to FIG. 20, an MST device 300 may include a first transmitter 310, a second transmitter 320, a first current measurement device 330, a second current measurement device 340, a first coil L1, a second coil L2, and a controller 350. Configurations and operations of the first transmitter 310, the second transmitter 320, the first coil L1, and the second coil L2 are substantially the same as those described with reference to FIGS. 4 to 19. In FIG. 20, the controller 350 is illustrated as being included in the MST device 300. However, in another example embodiment, the controller 350 may not be included in the MST device 300.

The first current measurement device 330 is connected between the terminal C1+ and the first coil L1. The first current measurement device 330 measures the amount of the first MST current Im1 and outputs the measured current amount as a first measurement value M_Im1. The second current measurement device 340 is connected between the terminal C2+ and the second coil L2. The second current measurement device 340 measures the amount of the second MST current Im2 and outputs the measured current amount as a second measurement value M_Im2. The first measurement value M_Im1 and the second measurement value M_Im2 are provided to the controller 350.

The controller 350 may include a memory and a processor (not shown).

The memory may include may include a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

The processor may be an arithmetic logic unit, a digital signal processor, a microcomputer, a field programmable array, a programmable logic unit, a microprocessor or any other device capable of responding to and executing instructions in a defined manner.

The memory may contain computer readable code that, when executed by the processor, configures the processor as a special purpose computer to control the amount of the first MST current Im1 and the amount of the second MST current Im2 based on the first measurement value M_Im1 and the second measurement value M_Im2, respectively. Therefore, the controller 350 may improve the functioning of the MST device 300 itself by reducing an amount of power consumed thereby.

For example, based on the first measurement value M_Im1 and the second measurement value M_Im2, the controller 350 stores a maximum value of the first MST current Im1 and a maximum value of the amount of the second MST current Im2 and compares the maximum values. The controller 350 may control at least one of the first transmitter 310 and the second transmitter 320 such that a maximum current amount of the first MST current Im1 and a maximum current amount of the second MST current Im2 coincide with each other.

The controller 350 may generate the control signal CTRL [1:8] for the purpose of controlling the first transmitter 310 and the second transmitter 320. The control signal CTRL [1:4] is provided to the first transmitter 310, and the control signal CTRL[5:8] is provided to the second transmitter 320. Also, based on the first measurement value M_Im1 and the second measurement value M_Im2, the controller 350 stores a variation in the first MST current Im1 and a variation in the second MST current Im2 and compares the stored variations. The controller 350 may control at least one of the first transmitter 310 and the second transmitter 320 such that the variation in the first MST current Im1 and the variation in the second MST current Im2 coincide with each other.

For example, based on the example embodiment of FIGS. 8, 9, 11, and 12, the controller 350 may control at least one of the maximum current amount of and variation in the first MST current Im1 and the maximum current amount of and variation in the second MST current Im2. The MST device 300 according to the example embodiment of FIG. 20 may control the variation in the first magnetic field B1 and the variation in the second magnetic field B2 more finely. Accordingly, the reliability of an MST signal that the MST device 300 generates may be improved. Example embodiments of the inventive concepts are not limited to the example embodiment of FIG. 20. That is, the first current measurement device 330 may be placed at any location capable of measuring the first MST current Im1. For example, the first current measurement device 330 may be placed within the first transmitter 310. The second current measurement device 340 may be placed at any location capable of measuring the second MST current Im2. Alternatively, the second current measurement device 340 may be placed within the second transmitter 320.

Figure 21:
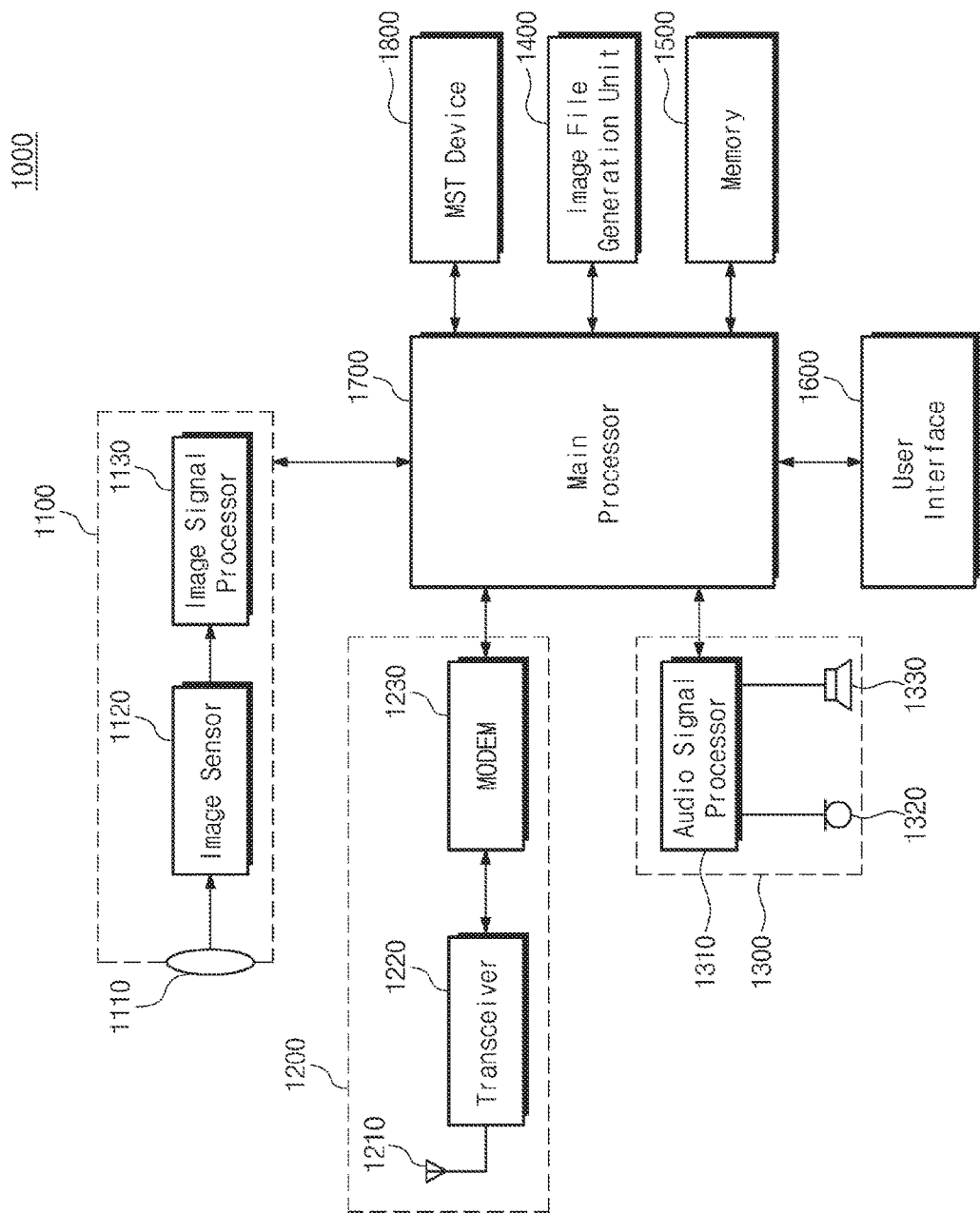
FIG. 21 is a view illustrating an electronic device including the MST device according to an example embodiment of the inventive concepts.

FIG. 21 is a view illustrating an electronic device including an MST device according to an example embodiment of the inventive concepts.

Referring to FIG. 21, an electronic device 1000 may include an image processing unit 1100, a wireless transceiver unit 1200, an audio processing unit 1300, an image file generation unit 1400, a memory 1500, a user interface 1600, a main processor 1700, and an MST device 1800.

The image processing unit 1100 may include a lens 1110, an image sensor 1120, and an image signal processor 1130.

The wireless transceiver unit 1200 may include an antenna 1210, a transceiver 1220, and a modulator/demodulator (MODEM) 1230. The audio processing unit 1300 includes an audio signal processor 1310, a microphone 1320, and a speaker 1330. The memory 1500 may be implemented with a memory card (e.g., a multimedia card (MMC), an embedded MMC (eMMC), a secure digital (SD) card, or a micro SD card) and the like. The user interface 1600 may include a keyboard, a touch pad, etc. The main processor 1700 may be implemented with a system on chip that drives an application program, an operating system, etc. For example, the main processor 1700 may include the controller 350 described with reference to FIG. 20.

The MST device 1800 may generate an MST signal under control of the main processor 1700. For example, the MST device 1800 may include one of the MST devices 10, 100, and 300 described with reference to FIGS. 1 to 20. The MST device 1800 according to an example embodiment of the inventive concepts may reduce power consumption. Accordingly, the power efficiency of the electronic device 1000 may be improved.

An MST device according to an example embodiment of the inventive concepts may reduce power consumption and the area. Accordingly, it may be possible to reduce the size of an electronic device including the MST device of the inventive concept and to improve power efficiency of the electronic device.

While example embodiments of the inventive concepts have been described with reference to some example embodiments, it will be apparent to those skilled in the art that various changes and modifications may be made without departing from the spirit and scope of the example embodiments of the inventive concepts. Therefore, it should be understood that the above example embodiments are not limiting, but illustrative.

What is claimed is:

1. A magnetic secure transmission (MST) device configured to generate an MST signal, the MST device comprising:
   a first transmitter configured to operate at a first operating frequency;
   a first coil configured to generate a first signal based on an operation of the first transmitter;
   a second transmitter configured to operate at a second operating frequency, the second operating frequency being a same frequency as the first operating frequency associated with the first transmitter; and
   a second coil configured to generate a second signal based on an operation of the second transmitter, the second signal offsetting or compensating for the first signal,
   wherein the second transmitter is configured to operate the second coil to,
      generate, in an interval where the MST device generates the MST signal, the second signal such that a sign of a magnetic flux associated with the second signal is same as a sign of a magnetic flux associated with the first signal to compensate, in the MST signal, for the magnetic flux associated with the first signal, and
      generate, in an interval where the MST device does not generate the MST signal, the second signal such that the sign of the magnetic flux associated with the second signal is opposite the sign of the magnetic flux associated with the second signal to offset, in the MST signal, the magnetic flux associated with the first signal, and
   wherein the MST device generates the MST signal as the first signal and the second signal overlap each other.

2. The MST device of claim 1, wherein
   the first coil is configured to generate the first signal such that the first signal includes a signal generated by a change in a magnetic field generated in the first coil, and
   the second coil is configured to generate the second signal such that the second signal includes a signal generated by a change in a magnetic field generated in the second coil.

3. The MST device of claim 1, wherein at least some of conducting wires of the first coil is located between conducting wires of the second coil.

4. The MST device of claim 3, wherein the first coil is wound in a same direction as the second coil.

5. The MST device of claim 3, wherein the first coil is wound in a opposite direction as the second coil.

6. The MST device of claim 3, wherein the first coil and the second coil are wound in a spiral shape on a plane.

7. The MST device of claim 3, wherein the first coil and the second coil are configured in a shape to wind a pillar.

8. The MST device of claim 1, wherein the first transmitter is configured to operate such that a current flowing in a first direction of the first coil varies in an interval where the first signal is generated.

9. The MST device of claim 8, wherein the first transmitter is configured to repeat, in the interval where the first signal is generated, an operation of allowing the current to flow in the first direction of the first coil and an operation of blocking the current from flowing.

10. The MST device of claim 8, wherein the first transmitter is configured to repeat, in the interval where the first signal is generated, an operation of allowing the current to flow in the first direction of the first coil and an operation of allowing a current to flow in a second direction, the second direction being opposite the first direction.

11. The MST device of claim 1, wherein the second transmitter is further configured to maintain, in an interval where the MST device does not generate the MST signal, the second signal of the interval where the MST device generates the MST signal.

12. An MST device configured to generate an MST signal, the MST device comprising:
    a first transmitter configured to operate at a first operating frequency;
    a first coil configured to generate a first signal based on an operation of the first transmitter;
    a second transmitter configured to operate at a second operating frequency, the second operating frequency being a same frequency as the first operating frequency; and
    a second coil configured to generate a second signal based on an operation of the second transmitter, at least some of conducting wires of the second coil being between conducting wires of the first coil,
    wherein the second transmitter is configured to operate the second coil to,
       generate, in an interval where the MST device generates the MST signal, the second signal such that a sign of a magnetic flux associated with the second signal is same as a sign of a magnetic flux associated with the first signal to compensate, in the MST signal, for the magnetic flux associated with the first signal, and generate, in an interval where the MST device does not generate the MST signal, the second signal such that the sign of the magnetic flux associated with the second signal is opposite the sign of the magnetic flux associated with the second signal to offset, in the MST signal, the magnetic flux associated with the first signal, and wherein the MST device is configured to generate the MST signal as the first signal and the second signal overlap each other.

13. The MST device of claim 12, wherein the first transmitter comprises:
a first switch electrically connected between a power supply voltage and a first terminal, a first end of the first coil being electrically connected to the first terminal;
a second switch electrically connected between the power supply voltage and a second terminal, a second end of the first coil being electrically connected to the second terminal;
a third switch electrically connected between the first terminal and a ground voltage; and
a fourth switch electrically connected between the second terminal and the ground voltage.

14. The MST device of claim 13, wherein in an interval where the first signal is generated, the first transmitter is configured to allow a current to flow from the first end of the first coil to the second end of the first coil by turning off the second switch and the third switch and turning on the first switch and the fourth switch.

15. The MST device of claim 13, wherein
in an interval where the first signal is generated, the first transmitter is configured to repeat a first operation and a second operation,
the first operation is an operation of allowing a current to flow from the first end of the first coil to the second end of the first coil by turning off the second switch and the third switch and turning on the first switch and the fourth switch, and
the second operation is an operation of blocking the current flowing to the first coil by connecting the first terminal and the second terminal to the ground voltage or the power supply voltage.

16. The MST device of claim 13, wherein
in an interval where the first signal is generated, the first transmitter is configured to repeat a first operation and a second operation,
the first operation is an operation of allowing a current to flow from the first end of the first coil to the second end by turning off the second switch and the third switch and turning on the first switch and the fourth switch, and
the second operation is an operation of allowing a current to flow from the second end of the first coil to the first end by turning off the first switch and the fourth switch and turning on the second switch and the third switch.

17. The MST device of claim 12, wherein the second transmitter is further configured to maintain, in an interval where the MST device does not generate the MST signal, the second signal of the interval where the MST device generates the MST signal.

18. An electronic device comprising:
an MST device configured to generate an MST signal based on an overlap between a first signal and a second signal, the MST device including a first transmitter configured to generate the first signal and a second transmitter configured to generate the second signal for offsetting or compensating for the first signal; and
a controller configured to control the first transmitter and the second transmitter, wherein
the first transmitter includes,
a first switch electrically connected between a power supply voltage and a first terminal, a first end of a first coil being electrically connected to the first terminal,
a second switch electrically connected between the power supply voltage and a second terminal, a second end of the first coil being electrically connected to the second terminal,
a third switch electrically connected between the first terminal and a ground voltage, and
a fourth switch electrically connected between the second terminal and the ground voltage.

19. The electronic device of claim 18, wherein the controller is configured to control at least one of the first transmitter and the second transmitter such that a maximum value of an amount of a current flowing to a first coil connected with the first transmitter and a maximum value of an amount of a current flowing to a second coil connected with the second transmitter coincide with each other.

20. The electronic device of claim 18, wherein the controller is configured to control at least one of the first transmitter and the second transmitter such that a variation in an amount of a current flowing to a first coil connected with the first transmitter and a variation in an amount of a current flowing to a second coil connected with the second transmitter coincide with each other.

* * * * *